United States Patent
Ryu et al.

(10) Patent No.: US 11,936,587 B2
(45) Date of Patent: *Mar. 19, 2024

(54) METHOD AND APPARATUS FOR PROCESSING SIGNAL OF SIDELINK FEEDBACK CHANNEL IN WIRELESS COMMUNICATION SYSTEM

(71) Applicant: Samsung Electronics Co., Ltd., Suwon-si (KR)

(72) Inventors: Hyunseok Ryu, Suwon-si (KR); Jeongho Yeo, Suwon-si (KR); Jinyoung Oh, Suwon-si (KR); Sungjin Park, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,737

(22) Filed: Jul. 8, 2022

(65) Prior Publication Data

US 2022/0345277 A1 Oct. 27, 2022

Related U.S. Application Data

(63) Continuation of application No. 16/832,994, filed on Mar. 27, 2020, now Pat. No. 11,387,963.

(30) Foreign Application Priority Data

Mar. 29, 2019 (KR) .................. 10-2019-0037198

(51) Int. Cl.
*H04L 5/00* (2006.01)
*H04W 4/40* (2018.01)
(Continued)

(52) U.S. Cl.
CPC ............. *H04L 5/0053* (2013.01); *H04W 4/40* (2018.02); *H04W 72/20* (2023.01); *H04W 92/18* (2013.01)

(58) Field of Classification Search
CPC ... H04L 1/0003; H04L 1/0009; H04L 1/0026; H04L 1/0035; H04L 1/005; H04L 1/0057;
(Continued)

(56) References Cited

U.S. PATENT DOCUMENTS 9,520,932 B2   12/2016   Lee et al.
11,411,688 B2*  8/2022   Hwang .................. H04L 1/1896
(Continued)

FOREIGN PATENT DOCUMENTS

CN   105493433 A   4/2016
CN   106304351 A   1/2017
(Continued)

OTHER PUBLICATIONS

NTT Docomo, Inc., Sidelink physical layer procedure for Nr V2X, R1-1902799, 3GPP TSG RAN WG1 #96, Athens, Greece, Feb. 16, 2019.
(Continued)

*Primary Examiner* — Thomas R Cairns
(74) *Attorney, Agent, or Firm* — Jefferson IP Law, LLP

(57) ABSTRACT

The disclosure relates to a pre-5$^{th}$-generation (5G) or 5G communication system to be provided for supporting higher data rates beyond 4$^{th}$-generation (4G) communication system, such as long term evolution (LTE). An apparatus and a method for performing effective signal processing on a sidelink feedback channel in a wireless communication system is provided. A method of operating a UE in a wireless communication system includes acquiring at least one of a source ID, a destination ID, or a cell ID, generating Sidelink Feedback Control Information (SFCI) to be transmitted
(Continued)

through a sidelink feedback channel (Physical Sidelink Feedback Channel (PSFCH)), performing channel encoding and scrambling on the SFCI using at least one of the source ID, the destination ID, or the cell ID, and transmitting the SFCI through the PSFCH.

20 Claims, 18 Drawing Sheets

(51) Int. Cl.
*H04W 72/20* (2023.01)
*H04W 92/18* (2009.01)

(58) Field of Classification Search
CPC ....... H04L 1/08; H04L 1/1819; H04L 1/1854; H04L 1/1861; H04L 5/0053; H04W 4/06; H04W 4/40–48; H04W 4/70; H04W 72/20; H04W 72/23; H04W 72/25; H04W 92/18

See application file for complete search history.

(56) References Cited

U.S. PATENT DOCUMENTS

| | | | |
|---|---|---|---|
| 2016/0249355 | A1 | 8/2016 | Chae et al. |
| 2018/0035398 | A1 | 2/2018 | Lee et al. |
| 2018/0035435 | A1 | 2/2018 | Gupta et al. |
| 2018/0116007 | A1 | 4/2018 | Yasukawa et al. |
| 2019/0044667 | A1 | 2/2019 | Guo et al. |
| 2021/0218511 | A1 | 7/2021 | Zhang et al. |

FOREIGN PATENT DOCUMENTS

| | | | | |
|---|---|---|---|---|
| CN | 107079530 | A | | 8/2017 |
| CN | 107431950 | A | | 12/2017 |
| CN | 107615844 | A | | 1/2018 |
| CN | 108432309 | A | | 8/2018 |
| CN | 109495230 | A | | 3/2019 |
| CN | 11342941 | A | | 6/2020 |
| EP | 3920452 | A1 | * 12/2021 | ............ H04L 1/1614 |
| WO | 2016108665 | A1 | | 7/2016 |
| WO | 2016204811 | A1 | | 12/2016 |
| WO | 2017084514 | A1 | | 5/2017 |
| WO | 2020/146580 | A1 | | 7/2020 |

OTHER PUBLICATIONS

NEC, Resource collision detection and handling, R1-162431, 3GPP TSG RAN WG1 Meeting #84bis, Busan, South Korea, Apr. 1, 2016.
Spreadtrum Communications, Discussion on Nr V2X physical layer procedure, R1-1902724, 3GPP TSG RAN WG1 #96, Athens, Greece, Feb. 16, 2019.
Huawei et al., Reference signal design for sidelink control and data channel, R1-1901538, 3GPP TSG RAN WG1 Meeting #96, Athens, Greece, Feb. 15, 2019.
International Search Report dated Jul. 21, 2020, issued in International Application No. PCT/KR2020/004220.
Extended European Search Report dated Apr. 22, 2022, issued in a counterpart European Application No. 20782613.2.
ZTE, Sanechips; Discussion on working scope of V2X; 3GPP TSG RAN Meeting #83; RP-190216; Mar. 11, 2019, Shenzhen, China.
Nokia, Nokia Shanghai Bell; On sidelink physical layer procedures; 3GPP TSG-RAN WG1 Meeting #96; R1-1902574; Feb. 16, 2019, Athens, Greece.
Lenovo, Motorola Mobility; Physical layer procedures in Nr V2X; 3GPP TSG RAN 3GPP TSG RAN WG1 #96; R1-1902157; Feb. 16, 2019, Athens, Greece.
CATT; Discussion on physical layer procedures in Nr V2X; 3GPP TSG RAN WG1 Meeting #96; R1-1901993; Feb. 16, 2019, Athens, Greece.
Vivo; Physical layer procedure for NR sidelink; 3GPP TSG RAN WG1 Ad-Hoc Meeting 1901; R1-1900118; Jan. 12, 2019, Taipei.
Naik et al. "IEEE 802.11 bd & 5G N R V2X: Evolution of Radio Access Technologies for V2X communications," arXiv.org, published Mar. 26, 2019, accessed via https://arxiv.org/pdf/1903.08391.pdf, pp. 1-12, on Oct. 14, 2021 (Year: 2019).
Chinese Office Action dated Jan. 11, 2024, issued in Chinese Patent Application No. 202080024356.2.
LG Electronics Inc.; Clarification on SCI transmission in ProSe; 3GPP TSG-RAN WG; 2 Meeting #89; R2-150378, Feb. 13, Athens, Greece.

* cited by examiner

METHOD AND APPARATUS FOR PROCESSING SIGNAL OF SIDELINK FEEDBACK CHANNEL IN WIRELESS COMMUNICATION SYSTEM

CROSS-REFERENCE TO RELATED APPLICATION(S)

This application is a continuation application of prior application Ser. No. 16/832,994, filed on Mar. 27, 2020, which is based on and claims priority under 35 U.S.C § 119(a) of a Korean patent application number 10-2019-0037198, filed on Mar. 29, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for processing a signal of a sidelink feedback channel in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G Network' or a 'post long term evolution (LTE) system'.

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G system, a vehicle to everything (V2X) technology has been developed. In a V2X system in which a sidelink feedback channel exists between terminals, a method and an apparatus for processing a signal to effectively transmit and receive a sidelink feedback channel by a user equipment (UE) are being discussed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively processing a signal of a sidelink feedback channel in a wireless communication system.

Additional aspects will be set forth in part in the description which follows and, in part, will be apparent from the description, or may be learned by practice of the presented embodiments.

In accordance with an aspect of the disclosure, a method of operating a UE in a wireless communication system is provided. The method includes acquiring at least one of a source identification (ID), a destination ID, or a cell ID, generating Sidelink Feedback Control Information (SFCI) to be transmitted through a sidelink feedback channel (Physical Sidelink Feedback Channel (PSFCH)), performing channel encoding and scrambling on the SFCI using at least one of the source ID, the destination ID, or the cell ID, and transmitting the SFCI through the PSFCH.

In accordance with another aspect of the disclosure, an apparatus of a UE in a wireless communication system is provided. The apparatus includes at least one transceiver, and at least one processor, wherein the at least one processor is configured to acquire at least one of a source ID, a destination ID, or a cell ID, generate Sidelink Feedback Control Information (SFCI) to be transmitted through a sidelink feedback channel (Physical Sidelink Feedback Channel (PSFCH)), perform channel encoding and scrambling on the SFCI using at least one of the source ID, the destination ID, or the cell ID, and transmit the SFCI through the PSFCH.

Various embodiments provide an apparatus and a method for effectively processing a signal of a sidelink feedback channel in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
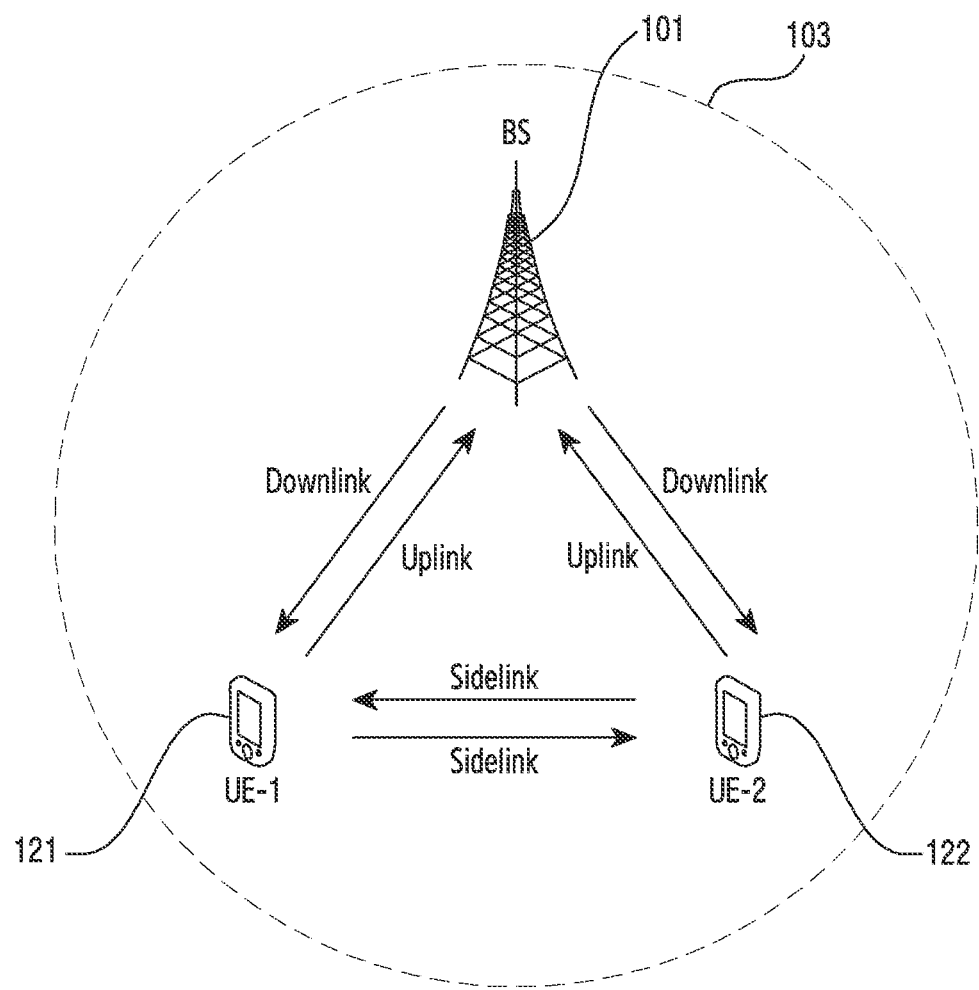
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

The detailed description of embodiments is made mainly based on a New Radio (NR) access network (or a new RAN) and packet core (a 5G system, a 5G core network, or a Next Generation (NG) core) which is a core network on the 5th Generation (5G) mobile communication standard specified by the 3rd Generation Partnership Project (3GPP) corresponding to a mobile communication standardization organization, but the main subject of the disclosure can be applied to other communication systems having a similar technical background with slight modification without departing from the scope of the disclosure, which can be determined by those skilled in the art.

In the 5G system, a Network Data Collection and Analysis Function (NWDAF) that is a network function for analyzing and providing data collected by a 5G network may be defined to support network automation. The NWDAF may collect information from the 5G network, store and analyze the information, and provide the result to an unspecified Network Function (NF), and the analysis result may be independently used by each NF.

For convenience of the description, the disclosure may use terms and names defined in a 3rd Generation Partnership Project Long Term Evolution (3GPP LTE) standard, a 5G New Radio (NR) standard, or a similar system standard. However, the disclosure is not limited to the terms or names, and may be equally applied to systems complying with other standards.

Terms for identifying access nodes in the following description, terms referring to network entities, terms referring to messages, terms referring to interfaces between network entities, and terms referring to various pieces of identification information are used for convenience of description. Accordingly, the disclosure is not limited to the terms used in the disclosure, and other terms referring to entities having the equivalent technical meaning may be used.

In order to meet wireless data traffic demands that have increased after 4G communication system commercialization, efforts to develop an improved 5G communication system (New Radio (NR)) have been made. The 5G communication system has been designed to use resources in a mmWave band, for example, a frequency band of 28 GHz in order to achieve a high data transmission rate. In the 5G communication system, technologies, such as beamforming, massive Multi-Input Multi-Output (MIMO), Full Dimensional MIMO (FD-MIMO), array antennas, analog beamforming, and large-scale antennas are being discussed to mitigate propagation path loss in the mmWave band and increase the propagation transmission distance. In addition, unlike LTE, the 5G communication system supports various subcarrier spacings, such as 30 kilohertz (kHz), 60 kHz, and 120 kHz including 15 kHz, and a physical control channel uses polar coding and a physical data channel uses Low Density Parity Check (LDPC) coding. Moreover, as a waveform for uplink transmission, not only Discrete Fourier Transform Spread Orthogonal Frequency Division Multiplexing (DFT-S-OFDM) but also Cyclic Prefix-based Orthogonal Frequency Division Multiplexing (CP-OFDM) are used. While resources for Hybrid Automatic Repeat Request (HARQ) retransmission in units of Transport Blocks (TBs) are allocated in LTE, resources for HARQ retransmission based on a Code Block Group (CBG) including a plurality of Code Blocks (CBs) may be additionally allocated in 5G.

Further, technologies, such as an evolved small cell, an advanced small cell, a cloud Radio Access Network (cloud RAN), an ultra-dense network, Device to Device communication (D2D), a wireless backhaul, a vehicle to everything network (a V2X network), cooperative communication, Coordinated Multi-Points (CoMP), and reception interference cancellation have been developed to improve the system network in the 5G communication system.

Meanwhile, the Internet has evolved from a human-oriented connection network, in which humans generate and consume information, to the Internet of Things (IoT), in which distributed components, such as objects exchange and process information. An Internet of Everything (IoE) technology in which a big data processing technology through a connection with a cloud server or the like is combined with the IoT technology has emerged. In order to implement the IoT, research is being conducted on technical factors, such as a sensing technique, wired/wireless communication and network infrastructure, service interface technology, and security technology are required, and thus technologies, such as a sensor network, Machine to Machine (M2M), Machine Type Communication (MTC), and the like for a connection between objects. In an IoT environment, through collection and analysis of data generated in connected objects, an intelligent Internet technology (IT) service to create a new value for peoples' lives may be provided. The IoT may be applied to fields, such as those of a smart home, a smart building, a smart city, a smart car, a connected car, a smart grid, health care, a smart home appliance, or high-tech medical services through the convergence of the information technology (IT) and various industries.

Accordingly, various attempts to apply the 5G communication to the IoT network are made. For example, 5G communication technologies, such as a sensor network, Machine-to-Machine (M2M) communication, and Machine-Type Communication (MTC) are implemented using beamforming, MIMO, and array-antenna schemes. The application of a cloud RAN as big-data processing technology is an example of convergence of the 5G technology and the IoT technology. As described above, a plurality of services may be provided to a user in a communication system, and in order to provide the plurality of services to the user, a method of providing each service in the same time interval according to a characteristic thereof and an apparatus using the same are needed. Various services provided by the 5G communication system are being researched, and one thereof is a service that satisfies requirements of low latency and high reliability.

In the case of vehicle communication, standardization of LTE-based V2X has been competed in 3GPP Rel-14 and Rel-15 based on the Device-to-Device (D2D) communication structure, and research on the development of V2X based on κG New Radio (NR) is currently conducted. In NR V2X, unicast communication, groupcast communication, multicast communication, and broadcast communication will be supported between UEs. Further, NR V2X aims at providing more evolved service, such as platooning, advanced driving, extended sensor, and remote driving, unlike LTE V2X aiming at transmitting and receiving basic safety information required for driving of vehicles.

The NR V2X transmission UE may transmit sidelink control information and data information to the NR V2X reception UE. The NR V2X reception UE receiving the same may transmit acknowledgement (ACK) or negative acknowledgement (NAKC) for the sidelink data information received by the NR V2X reception UE to the NR V2X transmission UE. The ACK/NACK information may be referred to as Sidelink Feedback Control Information (SFCI). The SFCI may be transmitted through a sidelink feedback channel (Physical Sidelink Feedback Channel (PSFCH)) of a physical layer.

Meanwhile, the NR V2X transmission UE may transmit a sidelink reference signal to allow the NR V2X reception UE to acquire information on a sidelink channel state. The sidelink reference signal may be a Demodulation Reference Signal (DMRS) used to estimate a channel by the NR V2X reception UE or a Channel State Information Reference Signal (CSI-RS) used to acquire channel state information. When the CSI-RS is used, the CSI-RS may be transmitted using frequency/time/code resources different from the DMRS. The NR V2X reception UE acquiring the sidelink channel state information through the DMRS or the CSI-RS transmitted by the NR V2X transmission UE may report the sidelink channel state information to the NR V2X transmission UE. At this time, the CSI reporting information may correspond to the above-described SFCI and may be transmitted through the sidelink feedback channel.

In another example, HARQ-ACK/NACK information and CSI reporting information may be multiplexed and simultaneously transmitted through a sidelink feedback channel.

Embodiments of the specification are proposed to support the above-described scenario and aims at providing a method and an apparatus for transmitting and receiving a sidelink feedback channel by an NR V2X UE.

Figure 1B:
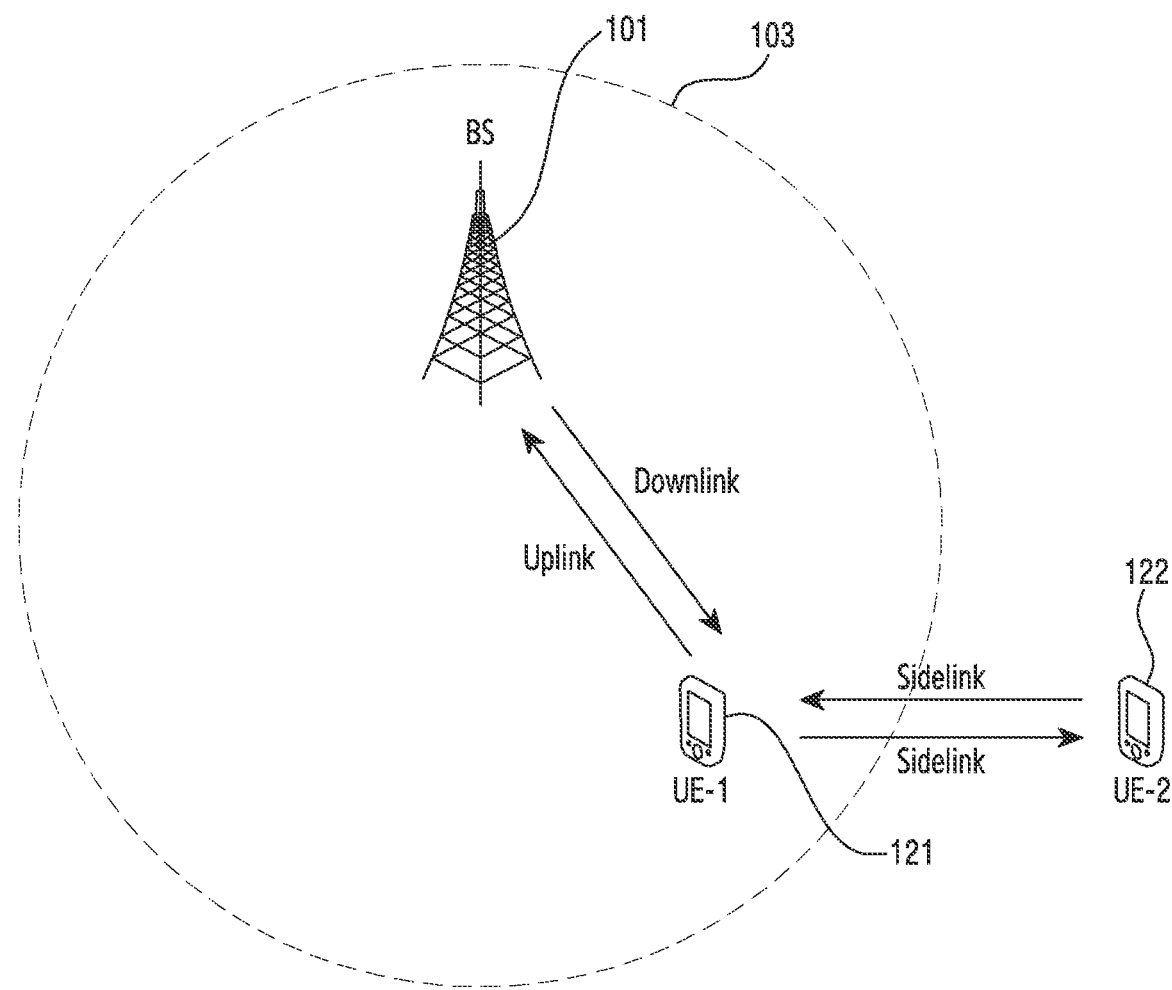
FIG. 1B illustrates a wireless communication system according to an embodiment of the disclosure.
Figure 1C:
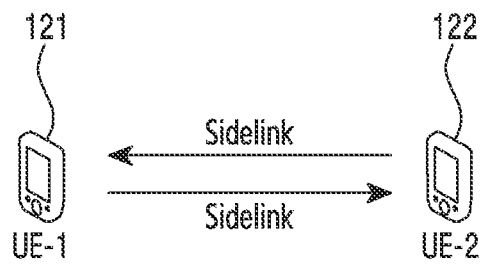
FIG. 1C illustrates a wireless communication system according to an embodiment of the disclosure.
Figure 1D:
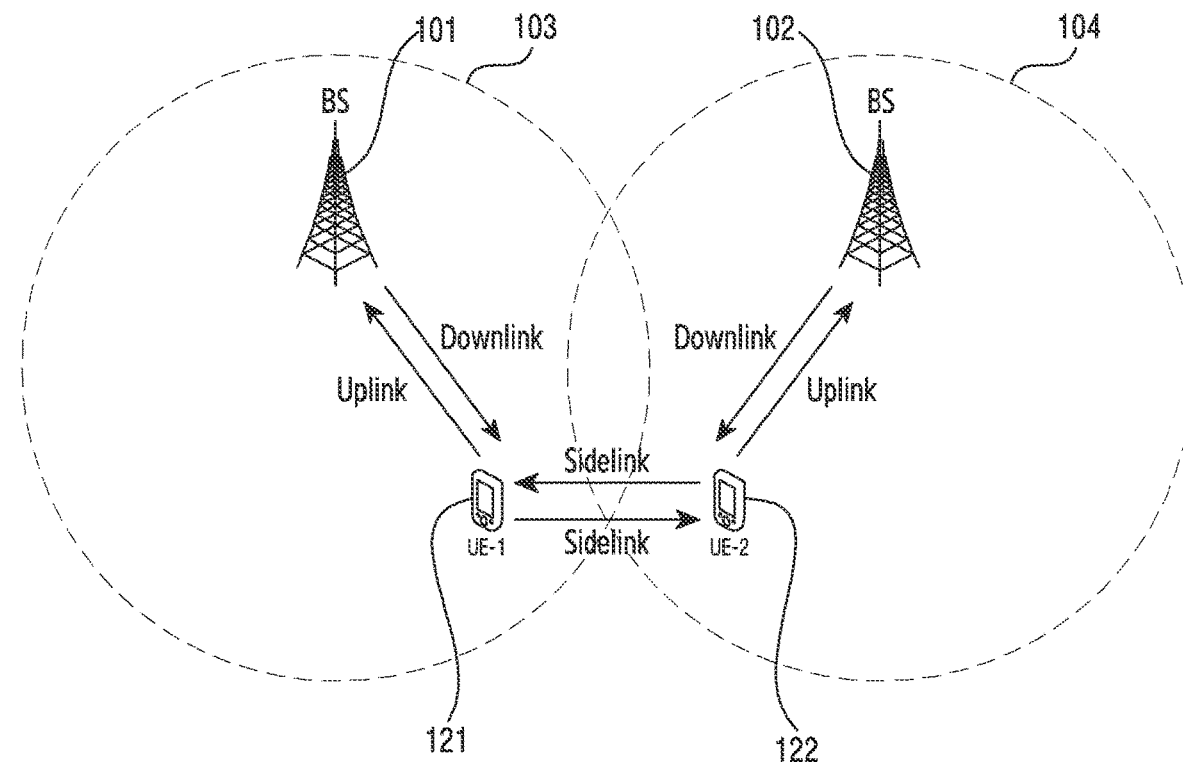
FIG. 1D illustrates a wireless communication system according to an embodiment of the disclosure.

FIG. 1A illustrates a wireless communication system according to an embodiment of the disclosure, FIG. 1B illustrates a wireless communication system according to an embodiment of the disclosure, FIG. 1C illustrates a wireless communication system according to an embodiment of the disclosure, and FIG. 1D illustrates a wireless communication system according to an embodiment of the disclosure. Specifically, FIGS. 1A, 1B, 1C and 1D illustrate an example of a system for describing an embodiment.

Referring to FIGS. 1A, 1B, 1C, and 1D, base Stations (BSs) 101 and 102 are network infrastructure for providing wireless access to terminals 121, 122, 123, 124, 125, 126, and 127. The BSs 101 and 102 have coverage area defined as a predetermined geographical region based on a distance to which a signal can be transmitted. The BS 101 or 102 may be referred to as "Access Point (AP)", "eNodeB (eNB)", "$5^{th}$-Generation (5G) node", "next generation NodeB (gNB)", "wireless point", "Transmission/Reception Point (TRP)", "Road Side Unit (RSU)", or other terms having an equivalent technical meaning, as well as a "base station".

In the specification, each of the terminals 121, 122, 123, 124, 125, 126, and 127 is a device used by a user and communicates with the BSs 101 and 102 through a radio channel According to circumstances, at least one of the terminals 121, 122, 123, 124, 125, 126, and 127 may be operated without any involvement of the user. For example, at least one of the terminals 121, 122, 123, 124, 125, 126, and 127 may be a device that performs Machine-Type Communication (MTC), and may not be carried by the user. Each of the UEs 121, 122, 123, 124, 125, 126, and 127 may be referred to as "user equipment", "mobile station", "subscriber station", "remote terminal", "wireless terminal", "user device", or other terms having the equivalent technical meaning, as well as a "terminal".

FIG. 1A illustrates a case in which all V2X terminals, that is, UE-1 121 and UE-2 122 are located within coverage area 103 of the BS 101.

All the V2X terminals 121 and 122 may receive data and control information from the BS 101 through downlink (DL) or transmit data and control information to the BS through uplink (UL). The data and the control information may be data and control information for V2X communication. Alternatively, the data and the control information may be data and control information for general cellular communication. The V2X terminals may transmit and receive data and control information for V2X communication through a sidelink (SL).

FIG. 1B illustrates a case in which UE-1 121 among the V2X terminals 121 and 122 is located within coverage area 103 of the BS 101 and UE-2 102 is located outside the coverage area 103 of the BS 101. The example of FIG. 1B may be an example related to partial coverage area.

UE-1 121 located within the coverage area of the BS 101 may receive data and control information from the BS 101 through a downlink (DL) and transmit data and control information to the BS 101 through an uplink (UL).

UE-2 122 located outside the coverage area 103 of the BS 101 cannot receive data or control information from the BS 101 through the downlink and cannot transmit data or control information to the BS 101 through the uplink.

UE-2 122 may transmit/receive data and control information for V2X communication to/from UE-1 121 through a sidelink.

FIG. 1C illustrates a case in which V2X terminals 121 and 122 are located outside the coverage area 103 of the BS 101.

Accordingly, UE-1 121 and UE-2 122 cannot receive data or control information from the BS 101 through the downlink and cannot transmit data or control information to the BS 101 through the uplink.

UE-1 121 and UE-2 122 may transmit/receive data and control information for V2X communication through the sidelink.

FIG. 1D illustrates a scenario in which terminals 121 and 122 located in different cells 103 and 104 perform V2X communication. Specifically, FIG. 1D illustrates a state in which a V2X transmission UE and a V2X reception UE access different BSs, that is, an Radio Resource Control (RRC)-connected state, or a state in which the terminals camp on the BSs, that is, an RRC connection-released state (RRC idle state). UE-1 121 may be the V2X transmission UE, and UE-2 122 may be the V2X reception UE. Alternatively, UE-1 121 may be the V2X reception UE, and UE-2 122 may be the V2X transmission UE. UE-1 121 may receive a V2X-dedicated System Information Block (SIB) from the BS 101 which UE-1 121 accesses or on which UE-1 121 camps, and UE-2 122 may receive a V2X-dedicated SIB from the other BS 102 which UE-2 122 accesses or on which UE-2 122 camps. Information on the V2X-dedicated SIB received by UE-1 121 and information on the V2X-dedicated SIB received by UE-2 122 may be different from each other. Accordingly, for V2X communication between the terminals 121 and 122 located in different cells 103 and 104, the information is required to be unified.

Although FIGS. 1A to 1D illustrate the V2X system including two terminals (UE-1 and UE-2) for convenience of description, the disclosure is not limited thereto. The downlink and uplink between the BS and the V2X UEs may be referred to as a Uu interface, and the sidelink between the V2X UEs may be referred to as a PC5 interface. Accordingly, the terms may be interchangeably used in the disclosure.

Meanwhile, in the disclosure, the UE may be a vehicle supporting Vehicle-to-Vehicle (V2V) communication, a vehicle or a handset of a pedestrian, that is, a smartphone supporting Vehicle-to-Pedestrian (V2P) communication, a vehicle supporting Vehicle-to-Network (V2N) communication, or a vehicle supporting Vehicle-to-Infrastructure (V2I) communication. In the disclosure, the terminal may be a Road Side Unit (RSU) having a UE function, an RSU having a BS function, or an RSU having some of the BS function and some of the UE function.

In the disclosure, it is predefined that the BS is a BS supporting both the V2X communication and the general cellular communication or a BS supporting only the V2X communication. The BS may be a 5G BS (gNB), a 4G BS (eNB), or an RSU. Accordingly, unless specially mentioned, the BS and the RSU may be the same concept and thus interchangeably used.

Figure 2A:
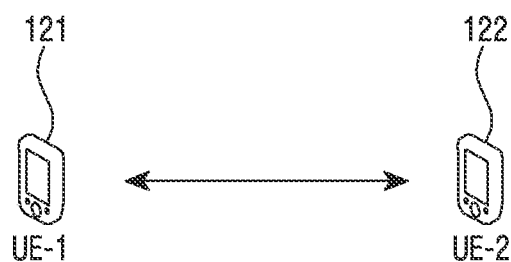
FIG. 2A illustrates a wireless communication system according to an embodiment of the disclosure.
Figure 2B:
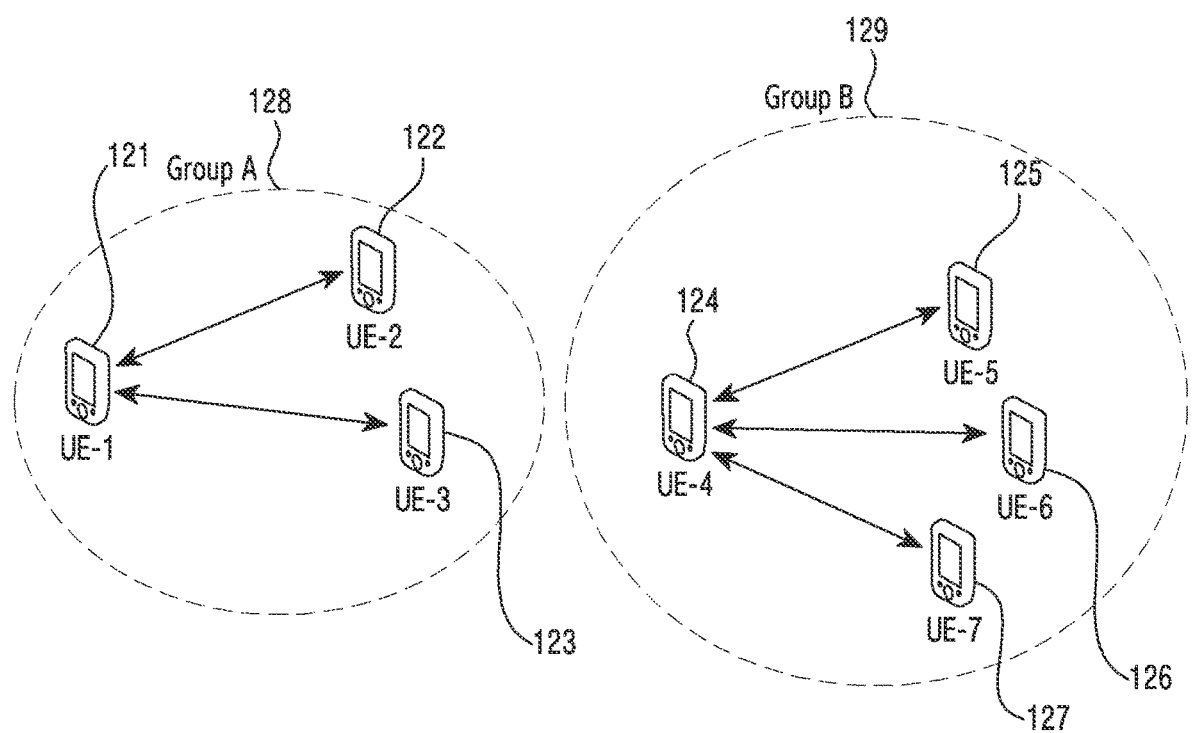
FIG. 2B illustrates a wireless communication system according to an embodiment of the disclosure.

FIG. 2A illustrates a wireless communication system according to an embodiment of the disclosure, and FIG. 2B illustrates a wireless communication system according to an embodiment of the disclosure. Specifically, FIGS. 2A and 2B illustrate an example of a V2X communication method performed through a sidelink.

Referring to FIG. 2A, a transmission UE and a reception UE may communicate in one-to-one manner, which may be called unicast communication.

Referring to FIG. 2B, a transmission UE and a reception UE may communicate in a one-to-many manner, which may be called groupcast or multicast communication.

Referring to FIG. 2B, UE-1 121, UE-2 122, and UE-3 123 form group A 128 to perform groupcast communication, and UE-4 124, UE-5 125, UE-6 126, and UE-7 127 may form group B 129 to perform groupcast communication. Each UE may perform groupcast communication only within the group to which the UE belongs, and may perform unicast, groupcast, or broadcast communication with a terminal located within a different group. Although FIG. 2B illustrates that the two groups 128 and 128 are formed, the disclosure is not necessarily limited to the two groups.

Meanwhile, although not illustrated in FIGS. 2A and 2B, the V2X UEs may perform broadcast communication. The broadcast communication is communication through which all V2X UEs receive data and control information transmitted by a V2X transmission UE through a sidelink. For example, when it is assumed that UE-1 121 is a transmission UE for broadcast in FIG. 2B, all UEs, that is, UE-2 122, UE-3 123, UE-4 124, UE-5 125, UE-6 126, and UE-7 127 may receive data and control information transmitted by UE-1 121.

Figure 3A:
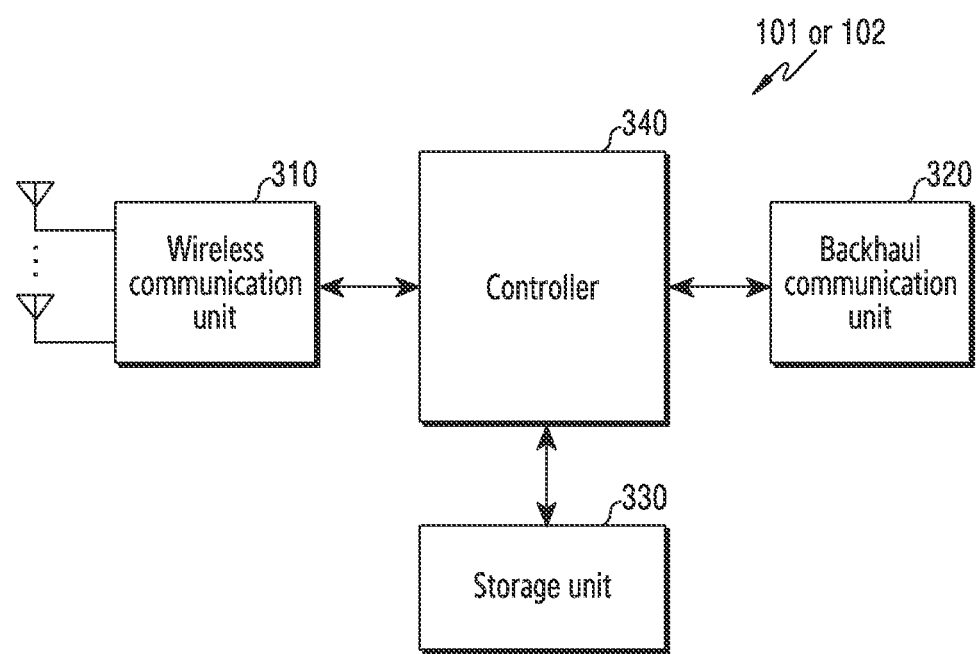
FIG. 3A illustrates a configuration of a base station (BS) in a wireless communication system according to an embodiment of the disclosure.

FIG. 3A illustrates a configuration of a BS in a wireless communication system according to an embodiment of the disclosure. The configuration illustrated in FIG. 3A may be understood as the configuration of the BS 101 or 102. The term "~unit" or "~er" used hereinafter may refer to the unit for processing at least one function or operation and may be implemented in hardware, software, or a combination of hardware and software.

Referring to FIG. 3A, the BS 101 or 102 includes a wireless communication unit 310, a backhaul communication unit 320, a storage unit 330, and a controller 340.

The wireless communication unit 310 performs functions for transmitting and receiving signals through a wireless channel. For example, the wireless communication unit 310 performs a function of conversion between a baseband signal and a bit stream according to a physical layer standard of the system. For example, in data transmission, the wireless communication unit 310 generates complex symbols by encoding and modulating a transmission bitstream. In data reception, the wireless communication unit 310 restores a reception bit stream by demodulating and decoding a baseband signal.

The wireless communication unit 310 up-converts a baseband signal into a Radio-Frequency (RF) band signal and transmits the same through an antenna, and down-converts an RF band signal received through an antenna into a baseband signal. To this end, the wireless communication unit 310 may include a transmission filter, a reception filter, an amplifier, a mixer, an oscillator, a Digital-to-Analog Convertor (DAC), an Analog-to-Digital Convertor (ADC), and the like. Further, the wireless communication unit 310 may include a plurality of transmission/reception paths. In addition, the wireless communication unit 310 may include at least one antenna array consisting of a plurality of antenna elements.

On the hardware side, the wireless communication unit 310 may include a digital unit and an analog unit, and the analog unit may include a plurality of sub-units according to operation power, operation frequency, and the like. The digital unit may be implemented by, for example, a Digital Signal Processor (DSP).

The wireless communication unit 310 transmits and receives the signal as described above. Accordingly, all or some of the wireless communication unit 310 may be referred to as a "transmitter", a "receiver", or a "transceiver". In addition, the transmission and reception performed through a radio channel described in the following description may be understood to mean that the above-described processing is performed by the wireless communication unit 310.

The backhaul communication unit 320 provides an interface for performing communication with other nodes within the network. That is, the backhaul communication unit 320 converts a bit stream transmitted from the base station to another node, for example, another access node, another base station, a higher node, or a core network, into a physical signal, and converts a physical signal received from another node into a bit stream.

The storage unit 330 stores data, such as a basic program, an application, or configuration information for the operation of the BS 101 or 102. The storage unit 330 may be configured as volatile memory, nonvolatile memory, or a combination of volatile memory and nonvolatile memory. Further, the storage unit 330 provides stored data in response to a request from the controller 340.

The controller 340 controls the overall operation of the BS 101 or 102. For example, the controller 340 transmits and receives a signal through the wireless communication unit 310 or the backhaul communication unit 320. Further, the controller 340 records data in the storage unit 330 and reads the recorded data. The controller 340 may perform the functions of a required protocol stack according to communication standards. According to another implementation, the protocol stack may be included in the wireless communication unit 310. To this end, the controller 340 may include at least one processor. The controller 340 may be functionally connected to the wireless communication unit 310, the backhaul communication unit 320, and the storage unit 330 of the BS 101 or 102 and may be configured to perform the operation method of the BS 101 or 102 according to various embodiments.

Figure 3B:
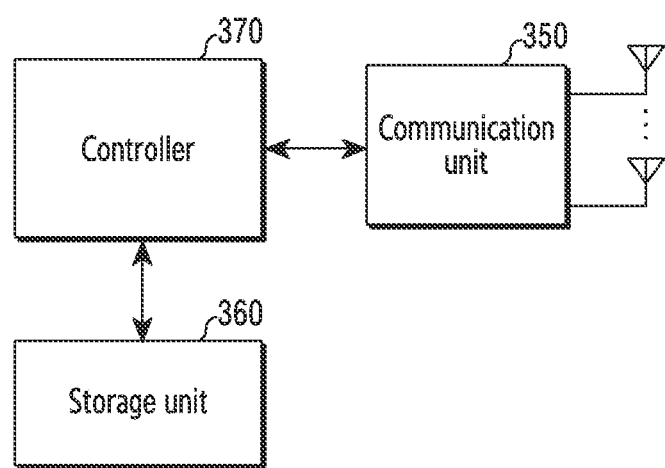
FIG. 3B illustrates a configuration of a UE in a wireless communication system according to an embodiment of the disclosure.

FIG. 3B illustrates a configuration of a UE in a wireless communication system according to an embodiment of the disclosure. FIG. 3B may be understood as the configuration of the UE 121, 122, 123, 124, 125, 126, or 127. The term "~unit" or "~er" used hereinafter may refer to the unit for processing at least one function or operation and may be implemented in hardware, software, or a combination of hardware and software.

Referring to FIG. 3B, the UE 121, 122, 123, 124, 125, 126, or 127 includes a communication unit 350, a storage unit 360, and a controller 370.

The communication unit 350 performs functions for transmitting/receiving a signal through a wireless channel. For example, the communication unit 350 performs a function of conversion between a baseband signal and a bit stream according to a physical layer standard of the system. For example, in data transmission, the communication unit 350 generates complex symbols by encoding and modulating a transmission bit stream. In data reception, the communication unit 350 restores a reception bit stream by demodulating and decoding a baseband signal. Further, the communication unit 350 up-converts a baseband signal to an RF band signal, transmits the RF band signal through an antenna, and then down-converts the RF band signal received through the antenna to the baseband signal. For example, the communication unit 350 may include a transmission filter, a reception filter, an amplifier, a mixer, an oscillator, a DAC, an ADC, and the like.

Further, the communication unit 350 may include a plurality of transmission/reception paths. In addition, the communication unit 350 may include at least one antenna array consisting of a plurality of antenna elements. On the hardware side, the communication unit 350 may include a digital circuit and an analog circuit (for example, a radio frequency integrated circuit (RFIC)). The digital circuit and the analog circuit may be implemented as a single package. The communication unit 350 may include a plurality of RF chains. The communication unit 350 may perform beamforming.

In addition, the communication unit 350 may include a plurality of communication modules for supporting a plurality of different radio access technologies. For example, the different radio access technologies may include Bluetooth Low Energy (BLE), wireless fidelity (Wi-Fi), Wi-Fi Gigabyte (WiGig), and cellular network, for example, Long-Term Evolution (LTE) or 5G NR. Further, different frequency bands may include a Super High Frequency (SHF), for example, bands from 3.5 GHz to 5 GHz and aF millimeter (mm) wave, for example, a band of 60 GHz.

The communication unit 350 transmits and receives the signal as described above. Accordingly, all or some of the communication unit 350 may be referred to as a "transmitter", a "receiver", or a "transceiver". In addition, transmission and reception performed through a wireless channel, which is described in the following descriptions, may be understood to mean that the above-described processing is performed by the communication unit 350.

The storage unit 360 stores data, such as a basic program, an application, and configuration information for the operation of the UE 121, 122, 123, 124, 125, 126, or 127. The storage unit 360 may be configured as volatile memory, nonvolatile memory, or a combination of volatile memory and nonvolatile memory. Further, the storage unit 360 provides stored data in response to a request from the controller 370.

The controller 370 controls the overall operation of the UE 121, 122, 123, 124, 125, 126, or 127. For example, the controller 370 transmits and receives a signal through the communication unit 350. Further, the controller 370 records data in the storage unit 360 and reads the recorded data. The controller 370 may perform protocol stack functions required by the communication standards. To this end, the controller 370 may include at least one processor or microprocessor, or may play the part of the processor. Further, the part of the communication unit 350 or the controller 370 may be referred to as a Communication Processor (CP). The controller 370 may be functionally connected to the communication unit 350 and the storage unit 360 of the UE 121, 122, 123, 124, 125, 126, or 127 and may be configured to perform the operation method of the UE 121, 122, 123, 124, 125, 126, or 127 according to various embodiments.

Figure 4:
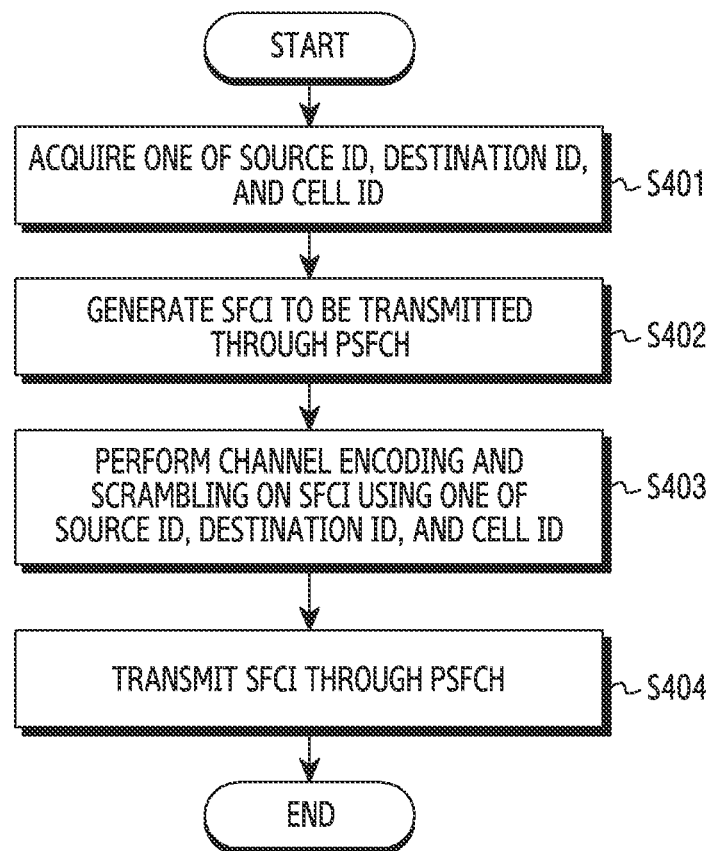
FIG. 4 is a flowchart illustrating an operation of a UE in a wireless communication system according to an embodiment of the disclosure.

FIG. 4 is a flowchart illustrating an operation of a UE in a wireless communication system according to an embodiment of the disclosure.

Referring to FIG. 4, the UE acquires at least one of a transmitter ID (source identifier), a destination ID, and a cell ID in operation S401. The destination ID may be one of a unicast destination ID, a groupcast destination ID, and a broadcast destination ID. According to an embodiment of the disclosure, the UE may acquire information on the transmitter ID and the destination ID through a service search process performed in an application layer. According to an embodiment of the disclosure, when the UE and another UE, which performs V2X communication with the UE, are all in the coverage area of the same BS, the UE and the other UE may acquire a cell ID from the corresponding BS. According to an embodiment of the disclosure, when the UE and the other UE performing V2X communication with the UE are all outside the coverage area of the BS, the UE and the other UE may acquire a predefined cell ID or a preconfigured cell ID. The predefined cell ID or the preconfigured cell ID may be a specific cell ID which the UE and the other UE has already known before V2X communication. According to an embodiment of the disclosure, when the UE and the other UE performing V2X communication with the UE are within the coverage area of different BSs, the UE and the other UE may acquire predefined cell IDs or preconfigured cell IDs. At this time, information on the cell IDs of different BSs may be exchanged.

In operation S402, the UE generates Sidelink Feedback Control Information (SFCI) to be transmitted through a sidelink feedback channel (Physical Sidelink Feedback Channel (PSFCH)). According to an embodiment of the disclosure, the UE may generate an SFCI to be transmitted through a PSFCH by a configuration or an indication from the BS or another UE performing V2X communication with the UE. For example, the UE may receive a configuration or indication indicating whether only NACK information should be transmitted or each of ACK and NACK information should be transmitted.

In operation S403, the UE performs channel encoding and scrambling for the SFCI based on at least one of the transmitter ID, the destination ID, and the cell ID. According to an embodiment of the disclosure, a scrambling sequence generator used for scrambling may be initialized based on at least one of the transmitter ID, the destination ID, and the cell ID. According to an embodiment of the disclosure, the PSFCH may include one or more Orthogonal Frequency Division Multiplexing (OFDM) symbols. According to an embodiment of the disclosure, the PSFCH may have one or more formats, and respective formats may use different signal processing methods. According to an embodiment of the disclosure, the PSFCH may have one or more formats having different signal processing methods according to the number of bits of the SFCI, and may include one or more OFDM symbols. According to an embodiment of the disclosure, the PSFCH may alternately include an OFDM symbol in which a Demodulation Reference Signal (DMRS) exists and an OFDM symbol in which no DMRS exists.

According to an embodiment of the disclosure, locations of Resource Elements (REs) for transmitting the DMRS are different in OFDM symbols included in the PSFCH.

In operation S404, the UE transmits the SFCI through the PSFCH. According to an embodiment of the disclosure, transmission of the SFCI may be performed through one of unicast, groupcast, and broadcast schemes. At this time, resources of the PSFCH may include not only resources distinguished in time or/and frequency domains but also resources distinguished using code, such as scrambling code or orthogonal cover code, and resources distinguished using different sequences and cyclic shift applied to the sequence.

Figure 5:
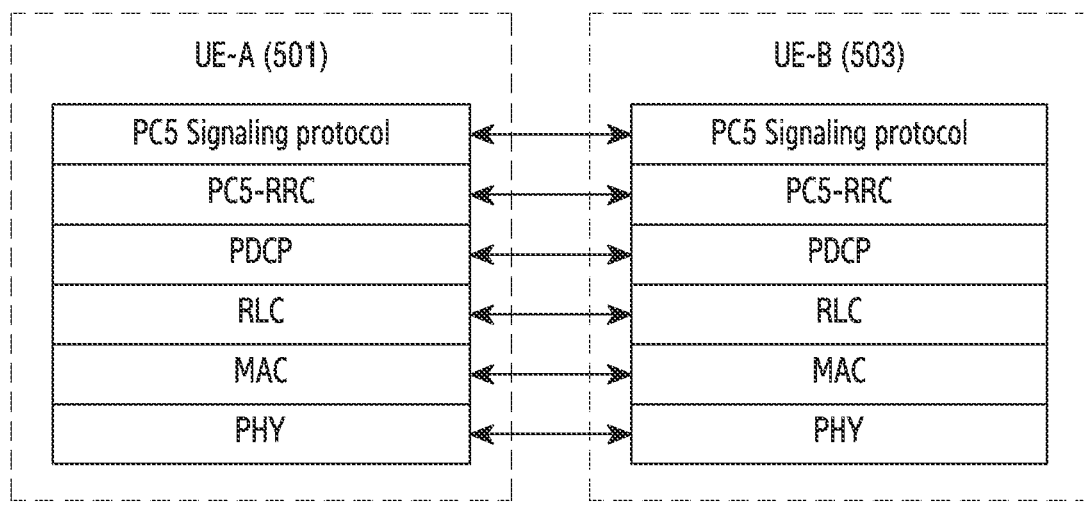
FIG. 5 illustrates a UE protocol for V2X communication in a wireless communication system according to an embodiment of the disclosure.

FIG. 5 illustrates a UE protocol for V2X communication in a wireless communication system according to an embodiment of the disclosure. Specifically, FIG. 5 illustrates an example of the UE protocol for V2X communication according to various embodiments.

Although not illustrated in FIG. 5, application layers of UE-A 501 and UE-B 503 may perform service discovery. The service discovery may include discovery indicating a V2X communication scheme, that is, a communication scheme to be performed by each UE among unicast, groupcast, and broadcast communication schemes.

Referring to FIG. 5, it may be assumed that UE-A 501 and UE-B 503 recognize that the unicast communication scheme will be performed via a service discovery process performed on the application layers. NR V2X UEs may acquire information on a transmitter ID (source identifier) and a destination ID (identifier) for NR V2X communication through the service discovery process.

When the service discovery process is completed, a direct link setup procedure between UEs may be performed in PC5 signaling protocol layers illustrated in FIG. 5. At this time, security setup information for direct communication between UEs may be exchanged.

When the direct link setup is completed, a PC5 RRC configuration procedure between UEs may be performed in the PC5 RRC layers of FIG. 5. At this time, UE capability information of UE-A 501 and UE-B 503 may be exchanged, and Access Stratum (AS) layer parameter information for unicast communication may be exchanged.

When the PC5 Radio Resource Control (RRC) configuration procedure is completed, UE-A 501 and UE-B 503 may perform unicast communication.

Although the unicast communication is described as an example, the groupcast communication may be applied. For example, when UE-A 501, UE-B 503, and UE-C, which is not illustrated in FIG. 5, perform groupcast communication, the service discovery, direct link setup, and PC5 RRC configuration procedures between UE-A 501 and UE-B 503 may be performed between UE-B 503 and UE-C and between UE-A 501 and UE-C.

Figure 6:
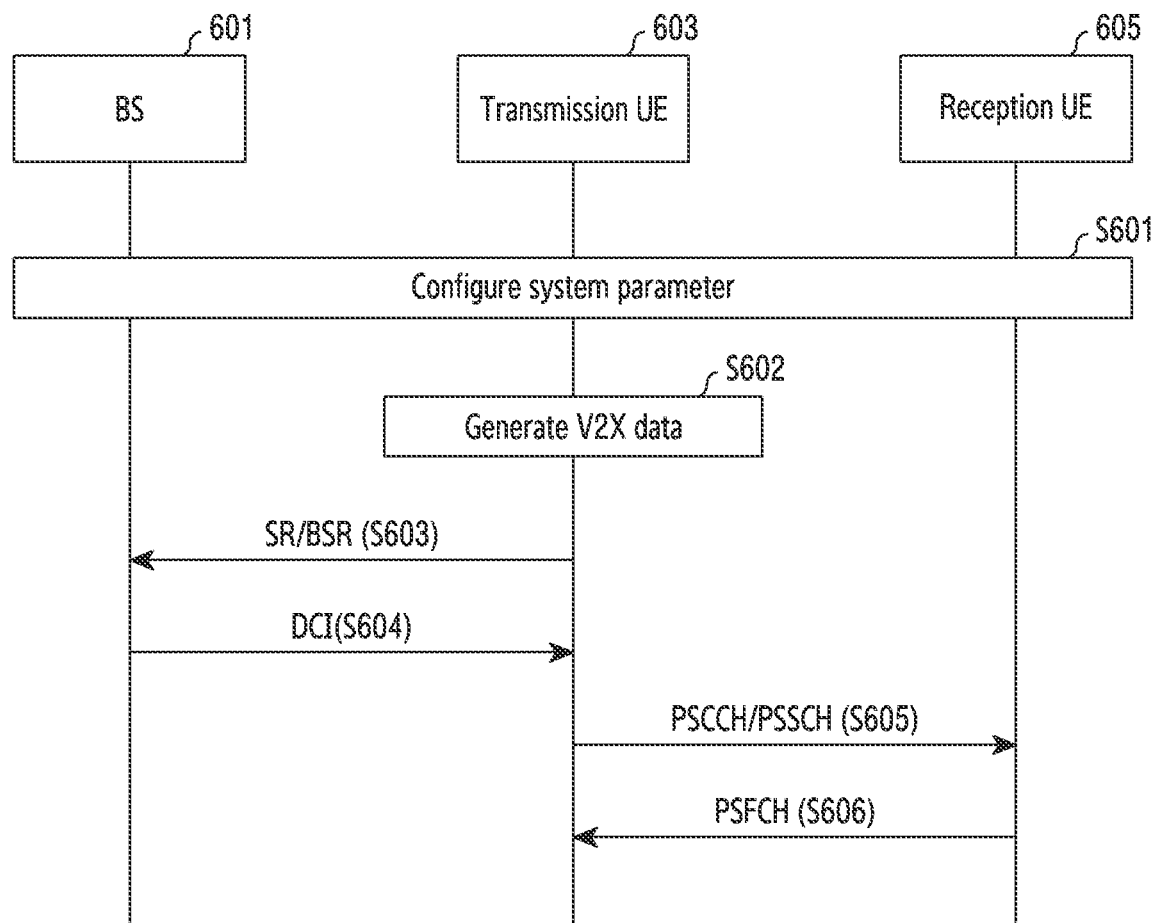
FIG. 6 is a signal flowchart illustrating a V2X communication process in a wireless communication system according to an embodiment of the disclosure.

FIG. 6 is a signal flowchart illustrating a V2X communication process in a wireless communication system according to an embodiment of the disclosure. Specifically, FIG. 6 illustrates an example of a V2X communication procedure according to an embodiment of the disclosure.

Referring to FIG. 6, a BS 601 may configure a parameter for V2X communication in V2X UEs 603 and 605 through system information in operation S601. For example, the BS 601 may configure information on a resource pool through which V2X communication can be performed in its own cell. The resource pool may be referred to as a transmission resource pool for V2X transmission or a reception resource pool for V2X reception. The V2X UEs 603 and 605 may receive a configuration of information on one or more resource pools from the BS 601. The BS 601 may configure unicast, groupcast, and broadcast communication to be performed in different resource pools through system information. For example, resource pool 1 may be used for unicast communication, resource pool 2 may be used for groupcast communication, and resource pool 3 may be used for broadcast communication. In another example, the BS 601 may configure unicast, groupcast, and broadcast communication to be performed within the same resource pool. The resource pool information configured by the BS 601 may include at least one piece of the following information.

1. Information on a resource pool through which a Physical Sidelink Control Channel (PSCCH) and a Physical Sidelink Shared Channel (PSSCH) can be transmitted in a time axis: specifically includes a slot index for transmitting a PSCCH and a PSSCH or a slot index for transmitting a PSCCH and a PSSCH and a symbol index within the corresponding slot.

2. Information on frequency resources of a sidelink feedback channel: refers to information on a resource pool through which a PSCCH and a PSSCH can be transmitted in a frequency axis and specifically includes an index of a resource block included in the resource pool or an index of a sub-channel including two or more resource blocks.

3. Information on whether or not sidelink HARQ-ACK is operated may be included in resource pool configuration information.

(1) In the case in which sidelink HARA-ACK is operated, at least one piece of the following information may be included.

(1-1) The number of maximum retransmissions (1-2) HARQ-ACK timing: indicates a time from a time point at which the V2X reception UE 605 receives sidelink control information and data information from the V2X transmission UE 603 to a time point at which the V2X reception UE 605 transmits HARQ-ACK/NACK information therefor to the V2X transmission UE 603. A unit of time may be a slot or one or more OFDM symbols.

(1-3) Physical Sidelink Feedback Channel (PSFCH) format: one PSFCH format may be used to transmit HARQ-ACK/NACK information of 1 bit or 2 bits when two or more PSFCH formats are operated. Another PSFCH format may be used to transmit HARQ-ACK/NACK information of 3 bits or more. Meanwhile, when the HARQ-ACK/NACK information is transmitted through the PSFCH, each of the ACK information and the NACK information may be transmitted through the PSFCH. When successfully decoding the PSSCH transmitted from the NR V2X transmission UE, the NR V2X reception UE may transmit ACK through the PSFCH. When failing in decoding, the NR V2X reception UE may transmit NACK through the PSFCH. In another example, the NR V2X reception UE may not transmit ACK when successfully decoding the PSSCH transmitted from the NR V2X transmission UE, and may transmit NACK through the PSFCH only when failing in decoding.

(1-4) A set of time/frequency/code resources included in the PSFCH: includes an index of a slot or a symbol in which the PSFCH is transmitted and a periodic in the case of time resources. In the case of frequency resources, the set of time/frequency/code resources may include a start point and an end point (or a start point and the length of frequency resources) of a sub-channel including a frequency Resource Block (RB) in which the PSFCH is transmitted or two or more successive blocks.

4. Information on whether blind retransmission is operated may be included in resource pool configuration information.

(1) Blind retransmission may be repeated transmission by the NR transmission UE without reception of feedback information of ACK or NACK by the NR transmission UE from the NR reception UE, unlike HARQ-ACK/NACK-based retransmission. When the blind retransmission is operated, the number of blind retransmissions may be included in the resource pool information. For example, when the number of blind retransmission is 4, the NR transmission UE may always transmit the same information four times when transmitting the PSCCH/PSSCH to the NR reception UE. At this time, a Redundancy Version (RV) value may be included in Sidelink Control Information (SCI) transmitted through the PSCCH.

5. Information on a DMRS pattern which can be used by the PSSCH transmitted in the corresponding resource pool.

(1) A DMRS pattern which can be used by the PSSCH may vary depending on a UE speed. For example, when the speed is fast, it is required to increase the number of OFDM symbols used for DMRS transmission in the time axis in order to improve the accuracy of channel estimation. When the UE speed is slow, the accuracy of channel estimation can be guaranteed even though the small number of DMRS symbols is used, so that it is required to decrease the number of OFDM symbols used for DMRS transmission in the time axis in order to reduce DMRS overhead. Accordingly, information on the resource pool may include information on a DMRS pattern which can be used for the corresponding resource pool. At this time, two or more DMRS patterns may be configured in one resource pool, and the NR V2X transmission UE 603 may select and use one DMRS pattern among the configured DMRS patterns according to its own speed. The NR V2X transmission UE 603 may transmit information on the DMRS pattern selected by the NR V2X transmission UE to the NR V2X reception UE 605 through SCI of the PSCCH. The NR V2X reception UE 605 may receive the information, acquire DMRS pattern information, estimate a channel for the PSSCH, and acquire sidelink data information via a demodulation and decoding process.

6. Information on whether a sidelink Channel State Information Reference Signal (CSI-RS) is operated.

(1) In the case in which the sidelink CSI-RS is operated, at least one piece of the following information may be included.

(1-1) CSI-RS transmission start time point: indicates a start time point at which the V2X transmission UE 603 should transmit a CSI-RS to the V2X reception UE 605. The start time point may refer to an index of a slot in which the CSI-RS is transmitted, an index of a symbol in which the CSI-RS is transmitted, or indexes of both the slot and the symbol.

(1-2) CSI reporting timing: indicates a time from a time point at which the V2X reception UE 605 receives the CSI-RS from the V2X transmission UE 603, that is, an index of a received slot or an index of a symbols within the received slot to a time point at which the V2X reception UE transmits a CSI report to the V2X transmission UE, that is, an index of a slot for transmitting the CSI report or an index of a symbol within the transmitted slot. A unit of time may be a slot or one or more OFDM symbols.

7. A parameter for controlling sidelink transmission power

Although the above-described information is included in the configuration of the resource pool for V2X communication, the disclosure is not limited thereto. For example, the information may be configured in the V2X transmission UE 603 or the V2X reception UE 605 independently from the configuration of the resource pool.

Referring to FIG. 6, when the V2X transmission UE 603 has data to be transmitted to the V2X reception UE 605 in operation S602, the V2X transmission UE 603 may make a request for sidelink resources to be transmitted to the V2X reception UE 605 to the BS 601 through a Scheduling Request (SR) or/and a Buffer Status Report (BSR). The BS 601 receiving the BSR may identify that the V2X transmission UE 603 has data for sidelink transmission and determine resources required for sidelink transmission based on the BSR.

The BS 601 may transmit a sidelink scheduling grant including at least one piece of resource information for Sidelink Control Information (SCI) transmission, resource information for sidelink data transmission, and resource information for sidelink feedback information to the V2X transmission UE 603 in operation S604. The sidelink scheduling grant is information for granting dynamic scheduling in the sidelink and may be Downlink Control Information (DCI) transmitted through a Physical Downlink Control Channel (PDCCH). The sidelink scheduling grant may include information indicating a bandwidth part (BWP) in which sidelink transmission is performed, a Carrier Indicator Field (CIF) for sidelink transmission, or a carrier frequency indicator when the BS 601 is an NR BS, and may include only a CIF when the BS is an LTE BS. Further, the sidelink scheduling grant may further include feedback information of the sidelink data, that is, resource allocation-related information of the PSFCH in which ACK/NACK information is transmitted. When the sidelink transmission corresponds to groupcast, the resource allocation information may include information for allocating a plurality of PSFCH resources to a plurality of UEs within a group. The resource allocation-related information of the feedback information may be information indicating at least one of a plurality of feedback information resource candidate sets configured through higher-layer signaling.

The V2X transmission UE 603 receiving the sidelink scheduling grant transmits SCI for scheduling sidelink data according to the sidelink scheduling grant to the V2X reception UE 605 through a Physical Sidelink Control Channel (PSCCH) and transmits the sidelink data through a Physical Sidelink Shared Channel (PSSCH) in operation S605. The SCI may include at least one of resource allocation information used for sidelink data transmission, Modulation and Coding Scheme (MCS) information applied to sidelink data, group destination ID information, transmitter ID (source ID) information, unicast destination ID information, power control information for controlling sidelink power, Timing Advance (TA) information, DMRS configuration information for sidelink transmission, packet-repeated transmission-related information, for example, information on the number of packet-repeated transmissions, information on resource allocation when packets are repeatedly transmitted, a Redundancy Version (RV), and an HARQ process ID. The SCI may further include feedback information for sidelink data, that is, information indicating resources through which ACK/NACK information is transmitted.

The V2X reception UE 605 receiving the SCI receives sidelink data. Thereafter, the V2X reception UE 605 transmits ACK/NACK information indicating whether decoding of the sidelink data is succeeded or failed to the V2X transmission UE 603 through a Physical Sidelink Feedback Channel (PSFCH) in operation S606. Transmission of sidelink feedback information may be applied to unicast transmission or groupcast transmission, but the case of broadcast transmission is not excluded. When sidelink transmission corresponds to groupcast transmission, respective UEs receiving groupcast data may transmit feedback information through different PSFCH resources. Alternatively, respective UEs receiving groupcast data may transmit feedback information through the same PSFCH resources, in which case only NACK information may be fed back. For example, the UE receiving data does not perform feedback in the case of ACK. At this time, PSFCH resources may include not only resources distinguished in time or/and frequency domains but also resources distinguished using code, such as scrambling code or orthogonal cover code, and resources distinguished using different sequences and cyclic shift applied to the sequence.

FIG. 6 illustrates a scenario in which the V2X transmission UE 603 configures an uplink connection with the BS 601, that is, an RRC-connected state and both the V2X transmission UE 603 and the V2X reception UE 605 exist within the coverage area of the BS 601. Although not illustrated in FIG. 6, when the V2X transmission UE 603 has not configured the uplink connection with the BS 601, that is, in an RRC-idle state, the V2X transmission UE 603 may perform a random access procedure for configuring the uplink connection with the BS 601. Although not illustrated in FIG. 6, the V2X reception UE 605 may receive in advance the configuration of information for V2X communication in the scenario in which the V2X transmission UE 603 exists within the coverage area of the BS 601 and the V2X reception UE 605 exists outside the coverage area of the BS 601. Meanwhile, the V2X transmission UE 603 may receive the configuration of information for V2X communication from the BS 601 as illustrated in FIG. 6. When both the V2X transmission UE 603 and the V2X reception UE 605 exist outside the coverage area of the BS 601, the V2X transmission UE 603 and the V2X reception UE 605 may receive in advance and use the configuration of information of V2X communication. At this time, receiving in advance the configuration may be interpreted as using a value included in the UE when the UE is released. Alternatively, it may mean the most recently acquired information when the V2X transmission UE 603 or the V2X reception UE 605 has accessed the BS 601 and previously acquired the information on V2X communication through an RRC configuration or has acquired the information on V2X communication through system information of the BS 601.

Although not illustrated in FIG. 6, it may be assumed that the V2X transmission UE 603 completes the service discovery, the direct link setup procedure, and the PC5 RRC configuration with the V2X reception UE 605 through the procedure illustrated in FIG. 5 before transmitting the SR/BSR to the BS 601.

Figure 7:
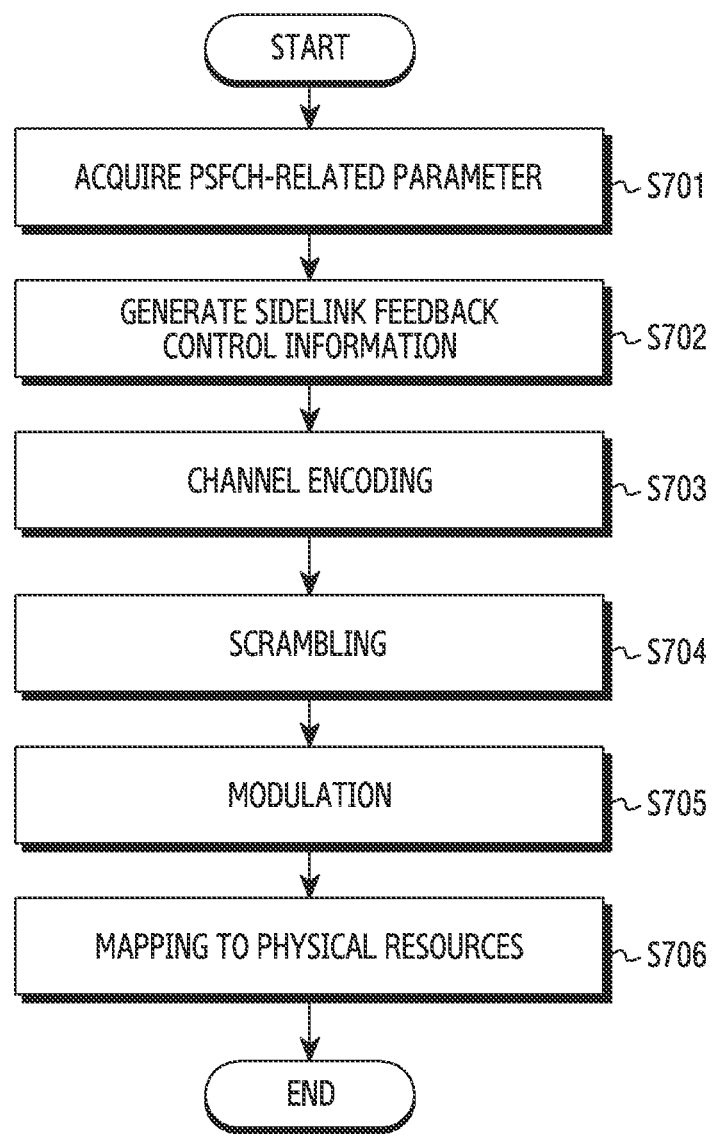
FIG. 7 illustrates a process in which a V2X UE transmits a sidelink feedback channel in a wireless communication system according to an embodiment of the disclosure.

FIG. 7 illustrates a process in which a V2X UE transmits a sidelink feedback channel in a wireless communication system according to an embodiment of the disclosure. Specifically, FIG. 7 illustrates an example of a signal processing method by which the V2X UE transmits a sidelink feedback channel according to an embodiment.

Referring to FIG. 7, the NR V2X reception UE may acquire parameters for sidelink feedback channel transmission through at least one of the following methods in operation S701.

1. When the NR V2X reception UE configures the RRC connection to the BS within the coverage area of the BS, the NR V2X reception UE may receive a configuration of parameters for sidelink feedback channel transmission from the BS though UE-specific RRC. At this time, the BS is a BS configuring the RRC connection, and may be an NR BS or an LTE BS.

2. When the NR V2X reception UE does not configure the RRC connection to the BS within the coverage area of the BS, that is, in an RRC idle state, the NR V2X reception UE may receive a configuration of parameters for sidelink feedback channel transmission from the BS through system information (System Information Block (SIB)).

3. In another example, the NR V2X reception UE may receive a configuration of parameters for sidelink feedback channel transmission from the NR V2X transmission UE that desires to perform unicast or groupcast communication with the NR V2X reception UE. At this time, the NR V2X transmission UE may transmit parameters for sidelink feedback channel transmission to the NR V2X reception UE through the sidelink control channel.

Information on the parameter for the sidelink feedback channel transmission may include the PSFCH-related information described in FIG. 6 and one or more pieces of the following information.

4. Information on time resources of the sidelink feedback channel: includes information on the resource pool through which the PSFCH can be transmitted in the time axis and, specifically, an index of a slot in which the PSFCH is transmitted or the index of the slot in which the PSFCH is transmitted and an index of a symbol within the corresponding slot.

(1) The NR V2X reception UE may receive information on the slot in which the PSFCH can be transmitted from the BS or the NR V2X transmission UE in a bitmap form. For example, the NR V2X UE receiving bitmap information of "1001" may transmit the PSFCH in a slot indicated by "1" and may not transmit the PSFCH in a slot indicated by "0". At this time, the BS or the NR V2X transmission UE may transmit information on a starting point, that is, a starting slot to which the corresponding bitmap is applied. For example, the information on the starting point may inform of an offset based on a System Frame Number (SFN) 0 of the BS, and the offset may be a starting point to which the bitmap can be applied. When there is no BS, that is, when the NR V2X reception UE exists outside the BS coverage area, a starting point, that is, an offset to which the bitmap can be applied on the basis a Direct Frame Number (DFN) 0 which the UE providing a sidelink synchronization signal transmits through a Physical Sidelink Broadcast Channel (PSBCH) may be indicated. In another example, information on the slot in which the PSFCH can be transmitted may be interpreted based on the slot in which the NR V2X UE receives the PSCCH or the PSSCH. For example, the BS or the NR V2X transmission UE may inform the NR V2X reception UE of transmission of the PSFCH after a "$K^{th}$ slot" from the slot in which the PSCCH or the PSSCH is received.

(2) When information on the symbol index is included in PSFCH time resource information, an index of a symbol in which the PSFCH starts and the length of symbols, that is, the number of symbols occupied by the PSFCH may be explicitly included. In another example, when the length of symbols varies depending on a format of the PSFCH, information on the slot in which the PSFCH is transmitted and information on the PSFCH format may be transmitted. For example, it may be assumed that PSFCH format 1 includes one Orthogonal Frequency Division Multiplexing (OFDM) symbol and PSFCH format 2 includes two OFDM symbols. At this time, the NR V2X reception UE may acquire information on time resources of the PSFCH to be transmitted by the NR V2X reception UE through the index of the slot in which the PSFCH is transmitted and a starting point and a format of the PSFCH symbol within the slot. In another example, the location of the PSFCH within the slot may be fixed. For example, when one slot consists of 14 OFDM symbols, the PSFCH may be always located at a $12^{th}$ OFDM symbol within the slot only when the PSFCH is operated. In this case, information on time resources of the PSFCH within the slot may be acquired through information on the number of OFDM symbols included in the PSFCH. In another example, when the number of OFDM symbols is defined according to the PSFCH format and the PSFCH exists at a fixed location within the slot as described above, information on time resources of the PSFCH may be acquired using only PSFCH format information.

5. Information on frequency resources of a sidelink feedback channel: refers to information on a resource pool through which a PSFCH can be transmitted in a frequency axis and specifically includes an index of a resource block included in the resource pool or an index of a sub-channel including two or more resource blocks.

(1) The NR V2X reception UE may receive information on the resource block in which the PSFCH can be transmitted from the BS or the NR V2X transmission UE in a bitmap form. For example, the NR V2X UE receiving bitmap information "1001" may transmit the PSFCH in an RB or a sub-channel indicated by "1" and may not transmit the PSFCH in an RB or a sub-channel indicated by "0". The BS or the NR V2X transmission UE may transmit information on a starting point, that is, a starting RB or a starting sub-channel to which the corresponding bitmap is applied. For example, information on the starting point may inform of an offset based on an RB having the lowest index, that is, index 0 in a system bandwidth operated by the BS, and the offset may be a starting point to which the bitmap may be applied. When there is no BS, that is, when the NR V2X reception UE exists outside the BS coverage area, a starting point, that is, an offset to which the bitmap can be applied based on the lowest index in a V2X communication bandwidth which the UE providing a sidelink synchronization signal transmits through a Physical Sidelink Broadcast Channel (PSBCH) may be indicated.

(2) In another example, information on the RB or the sub-channel in which the PSFCH can be transmitted may be interpreted based on the RB or the sub-channel in which the NR V2X UE receives the PSCCH or the PSSCH. For example, the BS or the NR V2X transmission UE may inform the NR V2X reception UE of transmission of the PSFCH after an "$N^{th}$ RB or sub-channel" from the RB or the sub-channel in which the PSCCH or the PSSCH is received. Information on the number of RBs or sub-channels in which the PSFCH is actually transmitted may be also transmitted together with the information on the starting point. The NR V2X UE receiving the information may transmit the PSFCH based on information on the starting point of frequency resources for PSFCH transmission and the number of RBs or the number of sub-channels.

(3) In another example, the NR V2X reception UE may know in advance transmission of the PSFCH in the "$N^{th}$ RB or sub-channel" based on the RB or sub-channel in which the PSCCH or the PSSCH is received. At this time, information which the UE knows in advance may be a value included in the UE when the UE is released. Alternatively, the information which the UE knows in advance may be the most recently acquired information when the UE has accessed the BS and acquired information on frequency resources through RRC information or when the UE has acquired information on frequency resources through system information of the BS without accessing the BS.

6. A type of an SFCI transmitted through a PSFCH: the NR V2X reception UE may receive information on the type of the SFCI transmitted through the PSFCH from the BS or the NR V2X transmission UE. The SFCI may include HARQ-ACK information or CSI information.

(1) When HARQ-ACK information is transmitted through the PSFCH, that is, when the SFCI is HARQ-ACK information, the NR V2X reception UE may receive a configuration or an indication of information indicating whether ACK information and NACK information should be separately transmitted or only NACK information should be transmitted from the BS or the NR V2X transmission UE. A method of the configuration or the indication may be one of the following methods.

(1-1) Whether the NR V2X reception UE should transmit only NAKC information or separately transmit ACK information and NACK information may be explicitly configured or indicated. For example, the configuration or indication may be performed when the NR V2X transmission UE and the NR V2X reception UE perform a PC5 RRC configuration. When the NR V2X transmission UE and the NR V2X reception UE exist within the coverage area of the BS, the NR V2X reception UE may acquire, through RRC configuration of the BS or system information of the BS, information indicating whether only NACK information should be transmitted or ACK information and NACK information should be separately transmitted. Further, the NR V2X transmission UE may analyze the SFCI transmitted from the NR V2X UE through the PSFCH by acquiring the information. For example, the information may be included in information on a resource pool through which the PSFCH can be transmitted or the PSCCH/PSSCH can be transmitted. For example, resource pool 1 may be configured to transmit only HARQ NACK, and resource pool 2 may be configured to transmit both HARQ-ACK and NACK. In another example, the NR V2X transmission UE may transmit an indication indicating whether the NR V2X reception UE should transmit only NACK information or separately transmit ACK information and NACK information to the NR V2X reception UE through Sidelink Control Information (SCI) transmitted through PSCCH.

(1-2) Whether the NR V2X reception UE should transmit only NAKC information or separately transmit ACK information and NACK information may be implicitly configured or indicated. For example, the corresponding information may be mapped to a format of the PSFCH which the NR V2X reception UE transmits. For example, PFSCH format 1 may indicate transmission of only HARQ-NACK, and PSFCH format 2 may indicate separate transmission of HARQ-ACK and HARQ-NACK. The BS or the NR V2X transmission UE may transmit information on the PSFCH format to be used by the NR V2X reception UE, and the PSFCH UE receiving the information may determine whether to transmit only NACK information or separately transmit ACK information and NACK information according to the corresponding format. In another example, the BS or the NR V2X transmission UE may transmit information on resources of the PSFCH to be used by the NR V2X reception UE, and the NR V2X reception UE receiving the information may determine whether to transmit only NACK information or separately transmit ACK information and NACK information according to the corresponding format. Specifically, when the NR V2X reception UE should transmit only NACK information, the BS or the NR V2X transmission UE may allocate one PSFCH resource to the NR V2X reception UE in a time, frequency, or code domain. When the NR V2X reception UE should separately transmit ACK information and NACK information, the BS or the NR V2X transmission UE may allocate two PSFCH resources to the NR V2X reception UE in a time, frequency, or code domain. The case in which two PSFCH resources are allocated in the code domain may be the case in which resources in the time axis and the frequency axis are the same but different sequences are used. Alternatively, resources in the time axis and the frequency axis are the same and the same type of sequences is used, but different Cyclic Shift (CS) values are used. For example, ACK information may be CS=0 and NACK information may be CS=6. Similarly, the case in which one PSFCH resource is allocated in the code domain may be the case in which resources in the time axis and the frequency axis are the same, and the same type of sequences and the same CS value are used.

(1-3) When there are two or more NR V2X reception UEs, that is, in groupcast communication, each of the NR V2X reception UEs may operate in a similar way to the above. For example, the BS or the NR V2X transmission UE may transmit a configuration or an indication indicating, to each NR V2X reception UE, whether only NACK information should be transmitted or both ACK information and NACK information should be transmitted. Such configuration or indication information may be explicitly or implicitly transmitted as described above. The operation of the NR V2X reception UE may be the same within the group. For example, all NR V2X reception UEs in the group may transmit only NACK information or both ACK information and NACK information according to the configuration or the indication of the BS or the NR V2X transmission UE. When only the NACK information is transmitted, all NR V2X reception UEs in the group may share at least the PSFCH resources in the time/frequency/code axis. When both the ACK information and the NACK information should be transmitted, the NR V2X reception UEs may orthogonally use the PSFCH resources in the time/frequency/code axis according to the configuration or the indication of the BS or the NR V2X transmission UE (that is, PSFCH resources in the time/frequency/code axis used by NR V2X reception UE 1 and NR V2X reception UE 2 are different), or two or more NR V2X reception UEs may share at least one of the PSFCH resources in the time/frequency/code axis.

(2) CSI information may be at least one of a Channel Quality Indicator (CQI), a Rank Indicator (RI), and a Precoder Matrix Indicator (PMI). The CSI information may be included in the SFCI, but may be transmitted to the NR V2X transmission UE through a sidelink data channel (Physical Sidelink Shared Channel (PSSCH)) rather than the PSFCH. If the NR V2X reception UE has sidelink data information to be transmitted to the NR V2X transmission UE when transmitting the CSI information to the corresponding NR V2X transmission UE through the PSSCH, the CSI information and the sidelink data information may be multiplexed and transmitted through the PSSCH in the same slot. In another example, if the NR V2X reception UE has sidelink data information to be transmitted to the NR V2X transmission UE when transmitting the CSI information to the corresponding NR V2X transmission UE through the PSSCH, only one piece of the CSI information and the sidelink data information may be transmitted. For example, the NR V2X reception UE may drop transmission of the sidelink data information and transmit only the CSI information. Alternatively, the NR V2X reception UE may drop the CSI information and may transmit only the sidelink data information.

(3) When CSI information is transmitted through the PSFCH, the CSI information may be multiplexed and transmitted simultaneously with HARQ-ACK information.

In operation S702, the NR V2X reception UE may generate SFCI information transmitted through the PSFCH by a configuration or an indication of the BS or the NR V2X transmission UE.

1. For example, the NR V2X reception UE may receive, from the BS or the NR V2X transmission UE, a configuration or an indication of information indicating whether HARQ-ACK/NACK information of one Transport Block (TB) is transmitted or HARQ-ACK/NACK information of two or more TBs is transmitted. When HARQ-ACK/NACK information of two or more TBs should be transmitted, a configuration or an indication of information indicating the number of TBs for which HARQ-ACK/NACK information should be transmitted may be received.

2. In operation S701, as described above, a configuration or an indication of information indicating whether only NACK information should be transmitted or ACK information and NACK information should be separately transmitted may be received.

3. In another example, a configuration or an indication of information indicating if HARQ-ACK/NACK information is transmitted in units of Code Block Groups (CBGs) rather than in units of TBs may be received. In this case, information on the number of CBGs may be configured or indicated.

4. When CSI information is transmitted through PSFCH, information on the SFCI included in the CSI may be configured or indicated. For example, information indicating whether all of the CQI, the RI, and the PMI are transmitted or only the CQI except for the RI and the PMI is transmitted may be configured or indicated.

5. Although the examples describe that all configurations or indications are made by the BS or the NR V2X transmission UE, the disclosure is not limited thereto. For example, the NR V2X reception UE may receive in advance a configuration of SFCI information transmitted through the PSFCH. The configuration made in advance may be a value included in the UE when the UE is released. Alternatively, the configuration made in advance may be the most recently acquired information when the UE has accessed the BS and acquired the corresponding information through RRC information or when the UE has acquired the corresponding information on through system information of the BS without accessing the BS.

In operation S703, the NR V2X reception UE may encode a channel using the SFCI information generated in operation S702, that is, a bit sequence. At this time, different channel encoding schemes may be applied according to the length of the generated bit sequence.

1. Reed-Muller (RM) code may be used when the length of a bit sequence included in SFCI information is 3 bits or larger and 11 bits or smaller (32, O). At this time, O may be SFCI information that is an input of the RM code, and 32 may be an output of the RM code. For example, 3 to 11 bits are encoded to 32 bits.

2. Polar code may be used when the length of the bit sequence included in SFCI information is 12 bits or larger. At this time, when the SFCI is 12 bits or larger and 19 bits or smaller, for example, when it is assumed that the SFCI is [x] bits, Cyclic Redundancy Check (CRC) of 6 bits may be added to the SFCI of [x] bits (that is, [x]+6 bits) and then channel encoding may performed. When the SFCI is 20 bits or larger, for example, when it is assumed that the SFCI is [y] bits, CRC of 11 bits may be added to the SFCI of [y] bits (that is, [y]+11 bits) and then channel encoding may be performed.

In operation S704, the NR V2X reception UE may scramble the bit sequence acquired through the channel encoding in operation S703.

1. When it is assumed that the M bit sequences are generated through the channel encoding in operation 703, the M bit sequences may be expressed as b(0), b(1), ... , b(M−1). At this time, a scrambling sequence c(i) may be added to b(0), b(1), ... , b(M−1), modulo 2 operation may be performed, and $\tilde{b}(i)$ may be generated as shown in Equation 1.

$$\tilde{b}(i)=(b(i)+c(i)) \bmod 2 \text{ where } i=0,1,\ldots,M-1 \quad \text{Equation 1}$$

In Equation 1, the scrambling sequence c(i) is a pseudo-random sequence and may correspond to a gold sequence having a length of 31. A scrambling sequence generator of c(i) used in Equation 1 may be initialized by Equation 2.

$$c_{init}=A\cdot 2^{\alpha}+B\cdot 2^{\beta}+\gamma \quad \text{Equation 2}$$

In Equation 2, there may be various combinations depending on α,β,γ, A, and B, and α,β,γ, A, and B may be determined by at least one of a transmitter ID (source ID), a destination ID, and a cell ID. It may be assumed that the transmission ID (source ID) includes [s] bits, the destination ID includes [d] bits, and the cell ID includes [c] bits. When both the NR V2X transmission UE and reception UE exist in the coverage area of the same BS, the NR V2X transmission UE and reception UE may acquire a cell ID used in Equation 2 from the corresponding BS. In another example, the NR V2X transmission UE and reception UE may always use the fixed cell ID for Equation 2. For example, the cell ID=510 or the cell ID=1024. Meanwhile, the NR V2X transmission UE may acquire destination ID information of the UE which the NR V2X transmission UE desires to transmit from higher layer, for example, an application layer or an L2 layer through at least one of the service discovery process, the direct link setup process, or the PC5 RRC configuration process for unicast or groupcast communication as described with reference to FIG. 5. Further, the NR V2X transmission UE may acquire information on the transmitter ID (source ID) of the NR V2X transmission UE from a higher layer thereof. Equation 2 may include the case in which both A and B are 0 and one of A and B is 0. In Equation 2, β may be influenced by γ, and α may be influenced by B and β. For example, as described above, when the cell ID=1024 is used as γ,γ may become 210 through binary conversion. In this case, β=11. When it is assumed that B=1, α=12. However, this is only an example, but is not limited thereto. For example, similar to the example, β=14 even though the cell ID=1024 is used as γ.

2. The NR V2X transmission UE may transmit information on a transmitter ID (source ID) or a destination ID, used by the NR V2X transmission UE, to the NR V2X reception UE through at least one of the following methods.

(1) Method 1) [s] Bits of the Transmitter ID (Source ID) and [d] Bits of the Destination ID are Transmitted Through the PSCCH (1-1) The V2X reception UE acquiring information on the transmitter ID (source ID) and the destination ID transmitted through SCI of the PSCCH may determine whether the destination ID included in the SCI corresponds to the V2X reception UE itself. When the destination ID corresponds to the V2X reception UE itself, that is, when the destination ID transmitted by the V2X transmission UE is the same as the destination ID received form a higher layer of the V2X reception UE, the V2X reception UE may decode the PSSCH through resource allocation information of the PSSCH included in the SCI. When the V2X reception UE successfully decodes the PSSCH, the V2X reception UE may transmit ACK information to the V2X transmission UE through the PSFCH. When the V2X reception UE fails in decoding the PSSCH, the V2X reception UE may transmit NACK information to the V2X transmission UE through the PSFCH. The PSFCH may be scrambled through initialization of the scrambling sequence generator as shown in Equation 2 based on at least one of the transmitter ID (source ID), the destination ID, and the cell ID acquired by the V2X UE through method 1) and the above-described method.

(1-2) When the destination ID transmitted through the SCI does not correspond to the V2X reception UE in the above example, the V2X reception UE may delete the corresponding SCI from its own buffer and may not decode the PSSCH.

(2) Method 2) [s] Bits of the Transmitter ID (Source ID) and Some of the Bits of the Destination ID are Transmitted Through the PSCCH (2-1) The remaining bits of the destination ID may be transmitted through a MAC header transmitted through the PSSCH or a MAC PDU. For example, MSB or LSB [d1] bits of the [d] bits of the destination ID may be transmitted through the PSCCH, and the remaining [d2] bits may be transmitted through the MAC header transmitted through the PSSCH or the MAC PDU ([d1]+[d2]=[d]).

(2-2) The V2X reception UE acquiring information on the transmitter ID (source ID) and the destination ID transmitted through SCI of the PSCCH may determine whether the [d1] bits of the destination ID included in the SCI corresponds to the V2X reception UE itself. When the destination ID corresponds to the V2X reception UE itself, the V2X reception UE may decode the PSSCH through resource allocation information of the PSSCH included in the SCI. When the V2X reception UE successfully decodes the PSSCH, the V2X reception UE may generate the destination ID of [d] bits through the remaining bits of the destination ID transmitted through the PSSCH, that is, [d1] bits and [d2] bits of destination ID received through the SCI. The V2X reception UE may compare the generated destination ID with the destination ID received from a higher layer of the V2X reception UE and finally identify whether the corresponding PSSCH is sidelink data to be received by the V2X reception UE. When it is recognized that the corresponding PSSCH is sidelink data to be received by the V2X reception UE through the final identification, the V2X reception UE may transfer the decoding result to the higher layer. When it is recognized that the corresponding PSSCH is not sidelink data to be received by the V2X reception UE through the final identification, the V2X reception UE may delete the decoding result from its own buffer without transferring the same to the higher layer.

(2-3) Meanwhile, the V2X reception UE successfully decoding the PSSCH and identifying that the corresponding PSSCH is sidelink data to be received by the V2X reception UE may transmit ACK information to the V2X transmission UE through the PSFCH. When the V2X reception UE fails in decoding the PSSCH, the V2X reception UE may transmit NACK information to the V2X transmission UE through the PSFCH. At this time, the V2X reception UE may initialize the scrambling sequence generator and perform scrambling as shown in Equation 2 based on at least one of the transmitter ID (source ID), the destination ID, and the cell ID acquired through method 2) and the above-described method.

(2-4) When the destination ID transmitted through the SCI does not correspond to the V2X reception UE in the above example, the V2X reception UE may delete the corresponding SCI from its own buffer and may not decode the PSSCH.

(3) Method 3) Some of the Bits of the Transmitter ID (Source ID) and [d] bits of the destination ID are transmitted through the PSCCH (3-1) The remaining bits of the transmitter ID may be transmitted through a Medium Access Control (MAC) header transmitted through the PSSCH or a MAC Protocol Data Unit (PDU). For example, most significant bits (MSB) or least significant bits (LSB) [s1] bits of the [s] bits of the transmitter ID (source ID) may be transmitted through the PSCCH, and the remaining [s2] bits may be transmitted through the MAC header transmitted through the PSSCH or the MAC PDU ([s1]+[s2]=[s]).

(3-2) The V2X reception UE acquiring information on the transmitter ID (source ID) and the destination ID transmitted through SCI of the PSCCH may determine whether the destination ID included in the SCI corresponds to the V2X reception UE itself. When the destination ID corresponds to the V2X reception UE itself, that is, when the destination ID transmitted by the V2X transmission UE is the same as the destination ID received form a higher layer of the V2X reception UE, the V2X reception UE may decode the PSSCH through resource allocation information of the PSSCH included in the SCI. When the V2X reception UE successfully decodes the PSSCH, the V2X reception UE may transmit ACK information to the V2X transmission UE through the PSFCH. When the V2X reception UE fails in decoding the PSSCH, the V2X reception UE may transmit NACK information to the V2X transmission UE through the PSFCH. The PSFCH may be scrambled through initialization of the scrambling sequence generator as shown in Equation 2 based on at least one of the transmitter ID (source ID), the destination ID, and the cell ID acquired by the V2X UE through method 3) and the above-described method.

(3-3) When the destination ID transmitted through the SCI does not correspond to the V2X reception UE in the above example, the V2X reception UE may delete the corresponding SCI from its own buffer and may not decode the PSSCH.

(4) Method 4) Some of the Bits of the Transmitter ID (Source ID) and Some of the bits of the destination ID are transmitted through the PSCCH. The remaining bits of the transmitter ID (source ID) and the destination ID may be transmitted through a MAC header transmitted through the PSSCH or a MAC PDU.

(4-1) The remaining bits of the transmitter ID may be transmitted through a MAC header transmitted through the PSSCH or a MAC PDU. For example, MSB or LSB [s1] bits of the [s] bits of the transmitter ID (source ID) may be transmitted through the PSCCH, and the remaining [s2] bits may be transmitted through the Medium Access Control (MAC) header transmitted through the PSSCH or the MAC Protocol Data Unit (PDU) ([s1]+[s2]=[s]).

(4-2) The remaining bits of the destination ID may be transmitted the MAC header transmitted through the PSSCH or the MAC PDU. For example, MSB or LSB [d1] bits of the [d] bits of the destination ID may be transmitted through the PSCCH, and the remaining [d2] bits may be transmitted through the MAC header transmitted through the PSSCH or the MAC PDU ([d1]+[d2]=[d]).

(4-3) The V2X reception UE acquiring information on the transmitter ID (source ID) and the destination ID transmitted through SCI of the PSCCH may determine whether the [d1] bits of the destination ID included in the SCI corresponds to the V2X reception UE itself. When the destination ID corresponds to the V2X reception UE itself, the V2X reception UE may decode the PSSCH through resource allocation information of the PSSCH included in the SCI. When the V2X reception UE successfully decodes the PSSCH, the V2X reception UE may generate the destination ID of [d] bits through the remaining bits of the destination ID transmitted through the PSSCH (that is, [d2] bits) and [d1] bits of destination ID received through the SCI. The V2X reception UE may compare the generated destination ID with the destination ID received from a higher layer of the V2X reception UE and finally identify whether the corresponding PSSCH is sidelink data to be received by the V2X reception UE. When it is recognized that the corresponding PSSCH is sidelink data to be received by the V2X reception UE through the final identification, the V2X reception UE may transfer the decoding result to the higher layer. When it is recognized that the corresponding PSSCH is not sidelink data to be received by the V2X reception UE through the final identification, the V2X reception UE may delete the decoding result from its own buffer without transferring the same to the higher layer.

(4-4) Meanwhile, the V2X reception UE successfully decoding the PSSCH and identifying that the corresponding PSSCH is sidelink data to be received by the V2X reception UE may transmit ACK information to the V2X transmission UE through the PSFCH. When the V2X reception UE fails in decoding the PSSCH, the V2X reception UE may transmit NACK information to the V2X transmission UE through the PSFCH. At this time, the V2X reception UE may initialize the scrambling sequence generator and perform scrambling as shown in Equation 4 based on at least one of the transmitter ID (source ID), the destination ID, and the cell ID acquired through method 2) and the above-described method.

(4-5) When the destination ID transmitted through the SCI does not correspond to the V2X reception UE in the above example, the V2X reception UE may delete the corresponding SCI from its own buffer and may not decode the PSSCH.

In operation S705, the scrambled sequence may be quadrature phase shift keying (QPSK)-modulated.

In operation S706, the QPSK-modulated symbols may be mapped to frequency resources (resource element (RE)) which are physical resources of the PSFCH. At this time, a Demodulation Reference Signal (DMRS) may be added to the PSFCH, and the QPSK-modulated symbols may be mapped to the remaining frequency resources except for the frequency resources of the PSFCH in which the DMRS is transmitted.

Although not illustrated in FIG. 7, after operation S706, OFDM symbols may be generated through Inverse Fast Fourier Transform (IFFT), a Cyclic Prefix (CP) may be added to the OFDM symbols, and the OFDM symbols may be transmitted through an antenna.

Although the above example has been described based on unicast communication in which the number of NR V2X reception UEs is one, the disclosure may also be applied to groupcast communication in which the number of NR V2X reception UEs is two or more.

Figure 8:
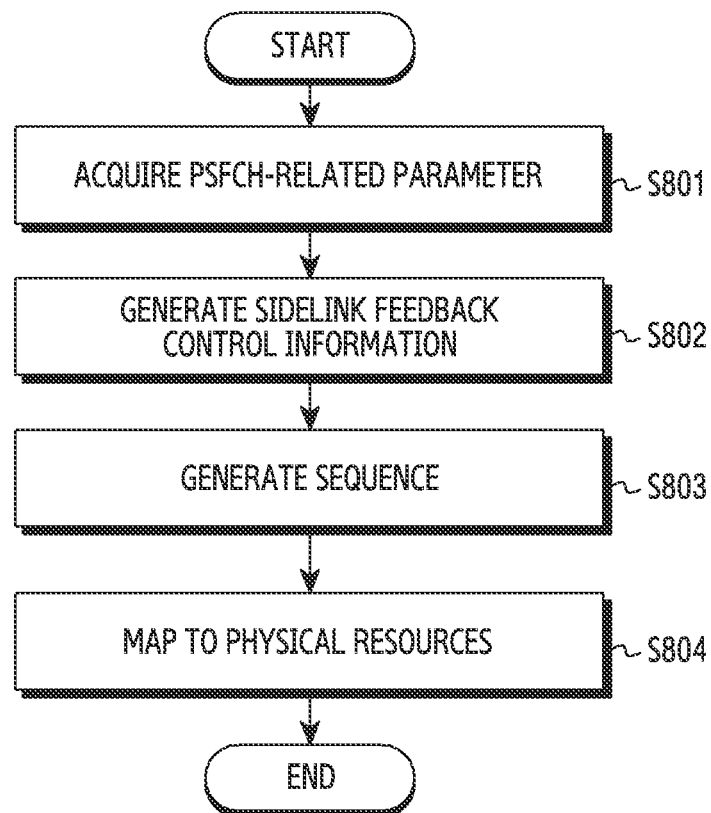
FIG. 8 illustrates a process in which a V2X UE transmits a sidelink feedback channel in a wireless communication system according to an embodiment of the disclosure.

FIG. 8 illustrates a process in which a V2X UE transmits a sidelink feedback channel in a wireless communication system according to an embodiment of the disclosure. Specifically, FIG. 8 illustrates an example of a signal processing method by which the V2X UE transmits a sidelink feedback channel according to an embodiment.

Referring to FIG. 8, in operation S801, the NR V2X reception UE may acquire parameters for sidelink feedback channel transmission through at least one of the methods described in operation S701 of FIG. 7. Information on the parameters for sidelink feedback channel transmission may include at least one piece of the PSFCH-related information described in FIG. 6, the PSFCH-related information described in operation S701 of FIG. 7, and the following information.

1. Information on code resources of the PSFCH: code resources may include resources distinguished using code, such as scrambling code or orthogonal cover code which can be used for the PSFCH and resources distinguished using different sequences (and a Cyclic Shift (CS) applied to the sequence). For example, when HARQ ACK/NACK is transmitted through the PSFCH, there may a CS which can be used for ACK and a CS which can be used for NACK.

2. Information on a PSFCH format: for example, when it is assumed that two PSFCH formats are supported, PSFCH format 1 may be used for transmitting SFCI information of two bits or smaller, and PSFCH format 2 may be used for transmitting SFCI information of 3 bits or larger. Accordingly, information on the PSFCH format may be PSFCH format 1 or PSFCH format 2 in the above example.

In operation S802, the NR V2X reception UE may generate SFCI information transmitted through the PSFCH by a configuration or an indication of the BS or the NR V2X transmission UE.

1. For example, whether only NACK information should be transmitted or ACK information and NACK information should be separately transmitted may be configured or indicated.

In operation S803, the sequence may be generated using the SFCI information generated in operation S802 and one of the methods described in operation S801.

1. One sequence may be mapped to one piece of SFCI information. For example, ACK information of 1 bit may indicate sequence 1, and NACK information of 1 bit may indicate sequence 2. ACK information of 2 bits may indicate sequence 3, and NACK information of 2 bits may indicate sequence 4. In the above example, different sequences may mean the use of different CS values. More specifically, when ACK/NACK information of 1 bit is transmitted in the above example, ACK information may use CS=0 and NACK information may use CS=6. Similarly, when ACK/NACK information of 2 bits is transmitted, (ACK, ACK) information may use CS=0, (ACK, NACK) information may use CS=3, (NACK, ACK) information may use CS=6, and (NACK, NACK) information may use CS=9.

2. In the above example, the length of the sequence may be proportional to the size of frequency resources configured or indicated by the BS or the V2X transmission UE for PSFCH transmission. For example, when the size of frequency resources of the PSFCH is configured or indicated to be 1, the length of the sequence which the V2X reception UE should generate may be 12×1=12. When the size of frequency resources of the PSFCH is configured or indicated to be 2, the length of the sequence which the V2X reception UE should generate may be 12×2=24.

3. In another example for the configuration of the sequence length, the BS or the V2X transmission UE may configure or indicate a set of the sizes of the frequency resources which can be used by the V2X reception UE, and the V2X reception UE may select and use one size of the frequency resource from the corresponding set. At this time, a selection reference may follow a reception quality of the PSCCH and/or PSSCH which the V2X reception UE receives from the V2X transmission UE. For example, when the reception quality is good, a sequence having a short length may be selected, that is, frequency resources having the small size may be used. When the reception quality is not good, a sequence having a long length may be selected. The BS or the V2X transmission UE may configure or indicate a threshold value for providing the determination reference by which the V2X reception UE determines the good or bad reception quality. More specifically, when the quality of the channel received by the V2X reception UE is equal to or smaller than a threshold value configured or indicated by the BS or the V2X transmission UE through comparison therebetween, it may be determined that the channel quality is bad. In the opposite case, it may be that the channel quality is good.

In operation S804, the generated sequence may be mapped to frequency resources (resource element (RE)) which are physical resources of the PSFCH. Unlike operation S706 of FIG. 7, no DMRS may be added.

Although not illustrated in FIG. 8, after operation S804, OFDM symbols may be generated through Inverse Fast Fourier Transform (IFFT), a Cyclic Prefix (CP) may be added to the OFDM symbols, and the OFDM symbols may be transmitted through an antenna.

Although the above example has been described based on unicast communication in which the number of NR V2X reception UEs is one, the disclosure may also be applied to groupcast communication in which the number of NR V2X reception UEs is two or more.

Figure 9:
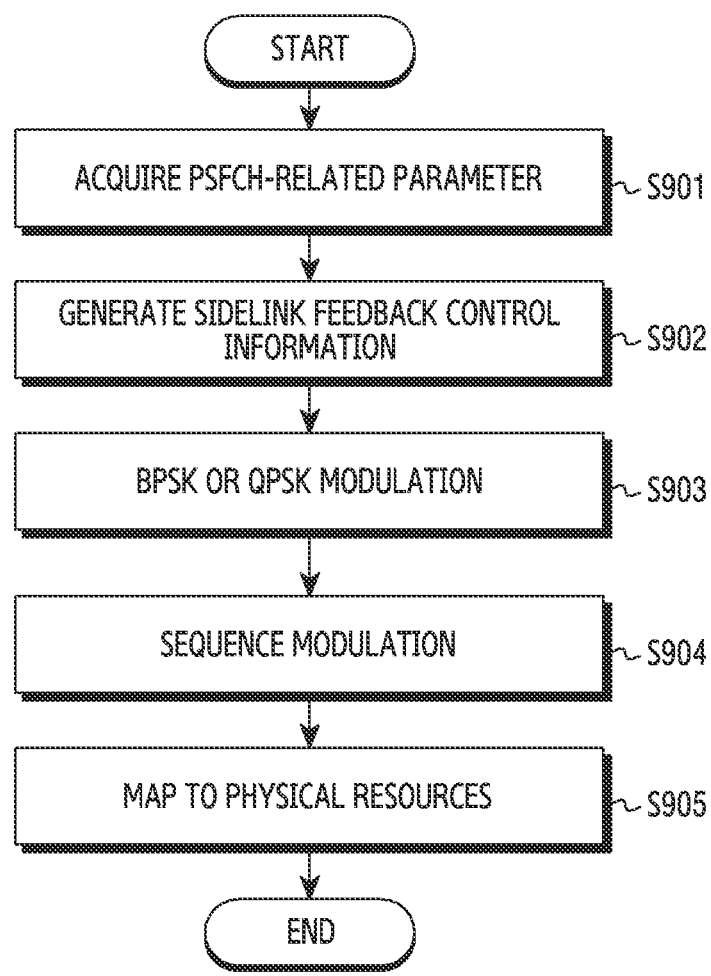
FIG. 9 illustrates a process in which a V2X UE transmits a sidelink feedback channel in a wireless communication system according to an embodiment of the disclosure.

FIG. 9 illustrates a process in which a V2X UE transmits a sidelink feedback channel in a wireless communication system according to an embodiment of the disclosure. Specifically, FIG. 9 illustrates another example of the signal processing method by which the V2X UE transmits the sidelink feedback channel according to an embodiment.

Referring to FIG. 9, in operation S901, the NR V2X reception UE may acquire parameters for sidelink feedback channel transmission through at least one of the methods described in operation S701 of FIG. 7. Information on the parameters for sidelink feedback channel transmission may include at least one piece of the PSFCH-related information described in FIG. 6, the PSFCH-related information described in operation S701 of FIG. 7, and the PSFCH-related information described in operation S801 of FIG. 8.

In operation S902, the NR V2X reception UE may generate SFCI information transmitted through the PSFCH by a configuration or an indication of the BS or the NR V2X transmission UE. At this time, as described in operation S702 of FIG. 7, whether only NACK information should be transmitted or ACK information and NACK information should be separately transmitted may be configured or indicated.

In operation S903, binary phase shift keying (BPSK) or QPSK modulation may be performed using the SFCI information generated in operation S902.

1. For example, the V2X reception UE may determine whether to transmit SFCI information of 1 bit or SFCI information of 2 bits through one of the methods in operation S902 or operation S702 of FIG. 7.

2. When the V2X reception UE determines to transmit SFCI information of 1 bit, the corresponding SFCI information may be BPSK-modulated. When the V2X reception UE determines to transmit SFCI information of 2 bits, the corresponding SFCI information may be QPSK-modulated.

3. The BPSK or QPSK-modulated SFCI information may be one modulated symbol. For example, the BPSK-modulated SFCI information may be a BPSK-modulated symbol, and the QPSK-modulated SFCI information may be a QPSK-modulated symbol. For example, when the SFCI information is BPSK-modulated, "+1" may indicate ACK information and "−1" may indicate NACK information. According to circumstances, vice versa. When the SFCI information is QPSK-modulated, "+1" may indicate (ACK, ACK) information, "−j" may indicate (ACK, NACK) information, "−1" may indicate (NACK, ACK) information, and "+j" may indicate (NACK, NACK) information. However, this is only an embodiment of the disclosure, and another one-to-one correspondence relationship between (ACK, ACK), (ACK, NACK), (NACK, ACK), (NACK, NACK) and {A, −1, +j, −j} may be used.

In operation S904, the BPSK or QPSK-modulated SFCI information in operation S903 may be sequence-modulated using at least one of the following methods.

1. At this time, sequence modulation may mean that the BPSK or QPSK-modulated symbol of operation S903 (that is, "+1" or "−1" in the case of BPSK modulation or "+1", "−j", "−1", or "+j" in the case of QPSK modulation) is multiplied by the sequence having a length of M.

(1) The sequence length M may be proportional to the size of frequency resources configured or indicated by the BS or the V2X transmission UE for PSFCH transmission. For example, when the size of frequency resources of the PSFCH is configured or indicated to be 1, the length M of the sequence which the V2X reception UE should generate may be 12×1=12. When the size of frequency resources of the PSFCH is configured or indicated to be 2, the length M of the sequence which the V2X reception UE should generate may be 12×2=24.

(2) In another example for the configuration of the sequence length, the BS or the V2X transmission UE may configure or indicate a set of the sizes of frequency resources which can be used by the V2X reception UE, and the V2X reception UE may select and use one size of the frequency resource from the corresponding set. At this time, a selection reference may follow a reception quality of the PSCCH and/or PSSCH which the V2X reception UE receives from the V2X transmission UE. For example, when the reception quality is good, the sequence of the short length may be selected (For example, the small size of frequency resources is used). When the reception quality is not good, the sequence of the long length may be selected. The BS or the V2X transmission UE may configure or indicate a threshold value for providing the determination reference with respect to the good or bad reception quality. More specifically, when the quality of the channel received by the V2X reception UE is equal to or smaller than a threshold value configured or indicated by the BS or the V2X transmission UE through comparison therebetween, it may be determined that the channel quality is bad. In the opposite case, it may be that the channel quality is good.

2. Sequence modulation may also have the following meaning in additional to the meaning of multiplication of the sequence length M and the BPSK or QPSK-modulated system described above.

(1) Orthogonal Cover Code (OCC) may be additionally multiplied by the generated sequence. This is to share the PSFCH using the same time/frequency resources between different users. For example, the same time/frequency resources are used for user multiplexing, but different code resources, that is, different OCCs may be used. At this time, an axis by which the OCC is multiplied may be a frequency axis before Inverse Fast Fourier Transform (IFFT) is performed or a time axis after IFFT is performed.

In operation S905, the generated sequence may be mapped to frequency resources (resource element (RE)) which are physical resources of the PSFCH. Unlike operation S706 of FIG. 7, no DMRS may be added.

Although not illustrated in FIG. 9, after operation S905, OFDM symbols may be generated through Inverse Fast Fourier Transform (IFFT), a Cyclic Prefix (CP) may be added to the OFDM symbols, and the OFDM symbols may be transmitted through an antenna.

Although the above example has been described based on unicast communication in which the number of NR V2X reception UEs is one, the disclosure may be applied to groupcast communication in which the number of NR V2X reception UEs is two or more.

Figure 10:
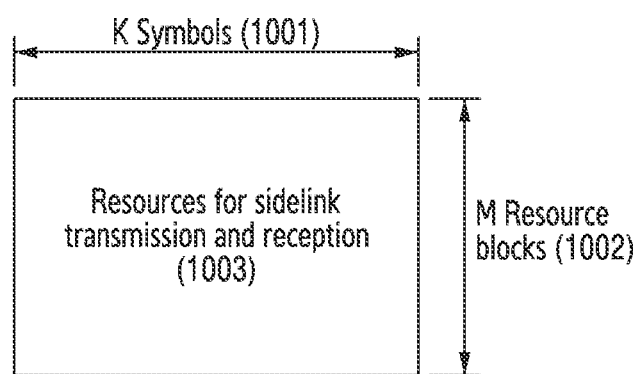
FIG. 10 illustrates sidelink resources through which a V2X UE performs V2X communication in a wireless communication system according to an embodiment of the disclosure.

FIG. 10 illustrates sidelink resources through which a V2X UE performs V2X communication in a wireless communication system according to an embodiment of the disclosure. FIG. 10 illustrates an example of sidelink resources through which the V2X UE performs V2X communication according to an embodiment.

Referring to FIG. 10, sidelink resources 1003 may include K symbols 1001 in the time axis and M Resource Blocks (RBs) 1002 in the frequency axis. One resource block 1002 may consist of 12 subcarriers. K symbols 1001 may be consecutive in the time axis physically or logically. When the K symbols are consecutive logically, the K symbols are non-consecutive physically. Similarly, M resource blocks 1002 may be consecutive in the frequency axis physically or logically. When the K symbols are consecutive logically, the K symbols are non-consecutive physically.

Although not illustrated in FIG. 10, the V2X transmission UE may use some or all of the sidelink resources 1003 of FIG. 10 to transmit sidelink control information or data information. The V2X reception UE may use some or all of the sidelink resources 1003 of FIG. 10 to receive sidelink control information or data information.

In another example, the V2X reception UE may use some or all of the sidelink resources 1003 of FIG. 10 to transmit sidelink feedback information to the V2X transmission UE. In FIGS. 10, K and M may be the same or may vary depending on the time point at which sidelink control information or data information is transmitted. For example, K and M at the time point of T1 at which the V2X transmission UE transmits sidelink control information or sidelink data information may be the same as or different from K and M at the time point of T2 at which sidelink control information or sidelink data information is transmitted.

Similarly, referring to FIGS. 10, K and M may be the same or may vary depending on the time point at which the V2X reception UE receives sidelink control information or data information. For example, K and M at the time point of T1 at which the V2X reception UE receives sidelink control information or sidelink data information may be the same as or different from K and M at the time point of T2 at which sidelink control information or sidelink data information is received.

Referring to FIGS. 10, K and M may be the same or may vary depending on the time point at which the V2X reception UE transmits sidelink feedback information to the V2X transmission UE. For example, K and M at the time point of T1 at which the V2X reception UE transmits sidelink feedback information to the V2X transmission UE may be the same as or different from K and M at the time point of T2 at which the sidelink feedback information is transmitted to the V2X transmission UE.

Figure 11:
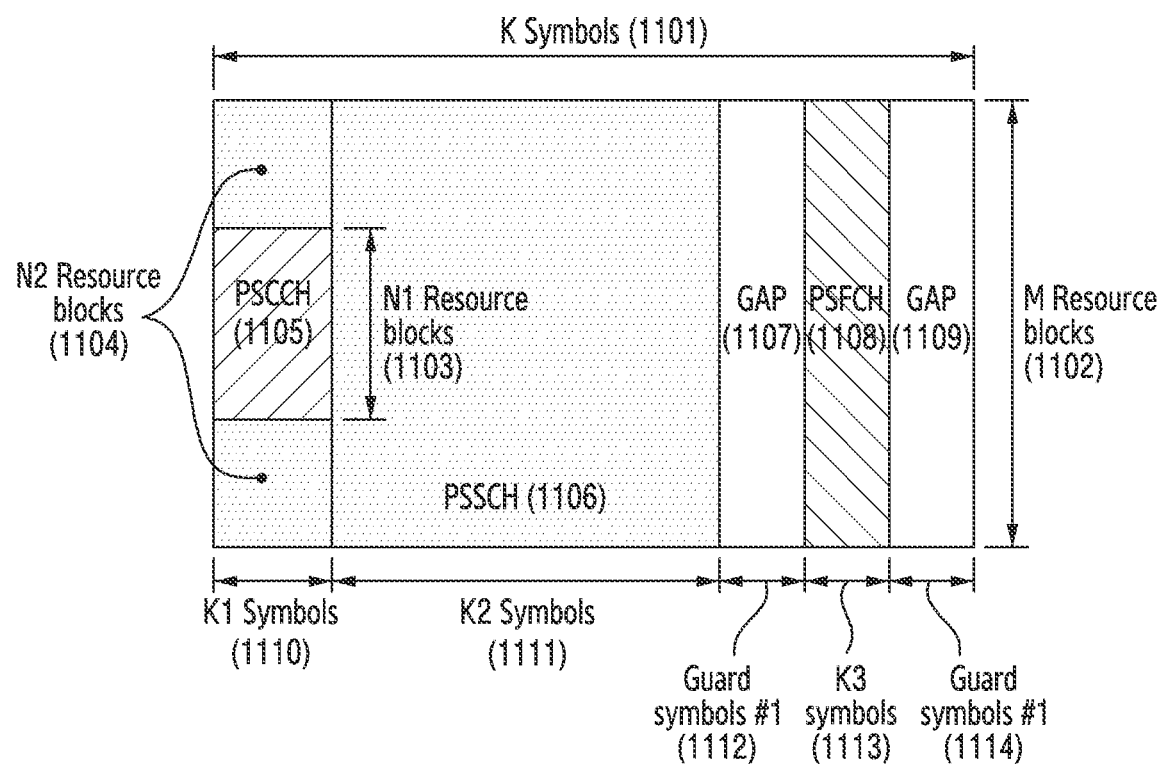
FIG. 11 illustrates a multiplexing scheme of a sidelink control channel, a sidelink data channel, and a sidelink feedback channel within sidelink resources in a wireless communication system according to an embodiment of the disclosure.

FIG. 11 illustrates a multiplexing scheme of a sidelink control channel, a sidelink data channel, and a sidelink feedback channel within sidelink resources in a wireless communication system according to an embodiment of the disclosure. Specifically, FIG. 11 illustrates an example of a multiplexing scheme of a sidelink control channel, a sidelink data channel, and a sidelink feedback channel within sidelink resources according to an embodiment.

Referring to FIG. 11, a sidelink control channel (Physical Sidelink Control Channel (PSCCH)) 1105 and a sidelink data channel (Physical Sidelink Shared Channel (PSSCH)) 1106 may be multiplexed in the time axis and the frequency axis. For example, Time Division Multiplexing (TDM) and Frequency Division Multiplexing (FDM) are shown.

The PSCCH 1105 and the PSSCH 1106 may include the different numbers of resource blocks in the frequency axis. For example, in the frequency axis, the PSCCH 1105 may include N1 frequency blocks 1003 and the PSSCH 1106 may include M frequency blocks 1104. N1 may be smaller than M (N1<M). However, the case in which the PSCCH 1105 and the PSSCH 1106 have the same number of resource blocks (M RBs) in the frequency axis is not excluded. The PSCCH 1105 and the PSSCH 1106 may be frequency-division-multiplexed in K1 symbols 1110 of the time axis, and only the PSSCH may be transmitted in the remaining K2 symbols 1111 without transmission of the PSCCH. For example, the PSCCH 1105 may include N1 frequency blocks 1103 in the frequency axis and K1 symbols 1110 in the time axis. The PSSCH 1106 may include N2 blocks 1104 during the length of K1 symbols 1110, and the PSSCH 1106 and the PSCCH 1105 may be frequency-divided. The PSSCH may include M frequency blocks 1102 during the length of K2 symbols 1111 without frequency-division with the PSCCH 1105. A sum of N2 and N1 may be the same as or different from M.

Although FIG. 11 illustrates that N1 frequency blocks 1103 included in the PSCCH 1105 and the PSSCH 1106 including (M−N2) frequency blocks are physically successively located, they are not physically successive. For example, they may be logically consecutive, but physically non-consecutive. Meanwhile, K1 and K2 may be the same as or different from each other. When K1 and K2 are different from each other, K1>K2 or K1<K2. The V2X transmission UE may insert time/frequency allocation information of the PSCCH 1106 into sidelink control information transmitted through the PSCCH 1105 and transmit the sidelink control information. V2X reception UE may receive and decode the PSCCH 1105, acquire time/frequency allocation information of the PSSCH 1106, and then decode the PSSCH 1106. Although FIG. 11 illustrates that the PSSCH 1106 including K2 symbols is physically continuous to K1 symbols 1110 included in the PSCCH 1105, the PSSCH 1106 may not be physically consecutive. For example, they may be logically consecutive, but physically non-consecutive.

FIG. 11 illustrates the case in which a sidelink feedback channel (Physical Sidelink Feedback Channel (PSFCH)) exists within sidelink resources including K symbols 1101. In this case, the sidelink resources may include K1 symbols 1110 of the PSCCH 1105, K2 symbols 1111 of the PSSCH 1106 ((K1 1110+K2 1111) symbols of the PSSCH 1106 when only symbols which are not frequency-division-multiplexed with the PSCCH 1105 and when FDM with the PSCCH 1105 is considered), guard symbols #1 1112, the PSFCH 1108, K symbols 1113, and guard symbols #2 1114. For example, K1 1110+K2 1111+guard symbols #1 1112+K2 1113+guard symbols #2 1114=K 1101. At this time, guard symbols #1 1112 and guard symbols #2 1114 may be one or more OFDM symbols. The guard symbols #1 1112 may be required for conversion between transmission and reception when the V2X transmission UE transmits the PSCCH 1105 and the PSSCH 1106 and receives the PSFCH 1108. On the other hand, a gap 1107 of guard symbols #1 1112 may be required for conversion between reception and transmission when the V2X reception UE receives the PSCCH 1105 and the PSSCH 1106 and transmit the PSFCH 1108. Similarly, a gap 1109 of guard symbols #2 1114 may be required for conversion between and reception and transmission when the V2X transmission UE receives the PSFCH 1108 from the V2X reception UE and transmits the PSCCH 1105 and the PSSCH 1106 in the next sidelink resources. On the other hands, the gap 1109 of guard symbols #2 1114 may be required for conversion between and transmission and reception when the V2X reception UE transmits the PSFCH 1108 to the V2X transmission UE and receives the PSCCH 1105 and the PSSCH 1106 in the next sidelink resources.

Meanwhile, although not illustrated in FIG. 11, one of guard symbols #1 1112 and guard symbols #2 1114 may be 0. For example, when the V2X transmission UE receives the PSFCH 1108 and receives the PSCCH 1105 and the PSSCH 1106 from another UE in the next sidelink resources, there is no need of conversion between reception and transmission, and thus the number of guard symbols #2 1114 may be 0. The disclosure does not exclude the case in which at least one of K1 1110, K2 1111, and K3 1113 is 0.

Although FIG. 11 illustrates that the size of frequency resource blocks of the PSFCH 1108 is the same as the PSSCH 1106 (that is, M RBs), the size of resource blocks of the PSFCH 1108 in the frequency axis may be the same as or different from the size of resource blocks of the PSCCH 1105 and the PSSCH 1106. The V2X reception UE may decode the PSSCH 1106, insert the result, that is, ACK/NACK information into the PSFCH 1108, and transmit the ACK/NACK information to the V2X transmission UE.

Figure 12:
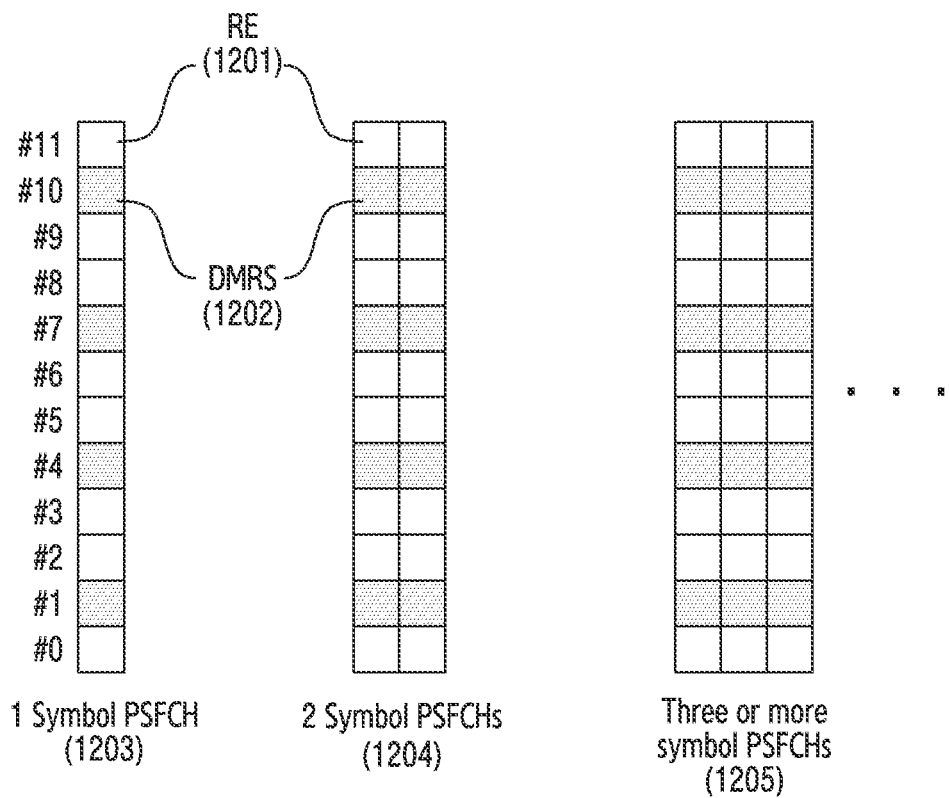
FIG. 12 illustrates a structure of a sidelink feedback channel in a wireless communication system according to an embodiment of the disclosure.

FIG. 12 illustrates a structure of a sidelink feedback channel in a wireless communication system according to an embodiment of the disclosure. Specifically, FIG. 12 illustrates an example of a structure of a sidelink feedback channel according to an embodiment.

Referring to FIG. 12, the sidelink feedback channel (PSFCH) may be used to transmit SFCI information generated by the procedure of FIG. 7. Although FIG. 12 illustrates that DMRS overhead is ⅓, that is, 4 REs are used as DMRSs 1202 in 12 Resource Elements (REs) 1201, the disclosure is not limited thereto. For example, when DMRS overhead is ¼, that is, when 3 REs are used as DMRSs 1202 in 12 Resource Elements (REs) 1201, the DMRSs 1202 may be mapped to RE index nos. 1, 5, and 9 (or 2, 6, and 10), and SFCI may be mapped to the remaining RE indexes.

Although FIG. 12 illustrates the structure of the PSFCH in one RB including 12 REs 1201, the structure may be equally applied to the PSFCH including two or more RBs. For example, when it is assumed that two RBs correspond to the size of PSFCH frequency resources transmitted by one V2X reception UE, the DMRSs may be mapped to RE indexes 1, 4, 7, 10, 13, 16, 19, and 22, and SFCI may be mapped to the remaining RE indexes.

When the PSFCH transmitted by one V2X reception UE includes two or more OFDM symbols in the time axis, the PSFCH 1203 including 1 OFDM symbol may be repeated. For example, when the PSFCH includes two OFDM symbols as indicated by reference numeral 1204 or when the PSFCH includes three OFDM symbols as indicated by reference numeral 1205, the PFSCH 1203 including 1 OFDM symbol may be repeated as illustrated in FIG. 12. Although not illustrated in FIG. 12, expansion of the structure of the PSFCH including four or more OFDM symbols is possible based on such principle.

The PSFCH illustrated in FIG. 12 may be mapped to K3 symbols within the sidelink resources of FIG. 11. Meanwhile, when SFCI information generated through the method of FIGS. 8 to 9 is transmitted through the PSFCH, the SFCI information may be mapped to all REs of the PSFCH without any RE used for DMRS transmission in FIG. 12. However, in this case, there is no DMRS, and thus channel estimation performance of the V2X transmission UE receiving the PSFCH may deteriorate. Accordingly, as illustrated in FIG. 12, the SFCI information generated through the method of FIGS. 8 to 9 may be mapped to only the remaining REs other than the REs used for DMRS transmission as illustrated in FIG. 12.

Although FIG. 12 illustrates that the DMRSs 1202 exist in the same REs 1201 in the frequency axis even though the number of OFDM symbols increase, the disclosure is not limited thereto. For example, when the PSFCH 1204 includes two OFDM symbols, the location of the DMRS RE in the second OFDM symbol may be different from the location of the DMRS RE existing in the first OFDM symbol. Similarly, when the PSFCH 1205 includes three OFDM symbols, the location of the DMRS RE in each OFDM symbol may be different from each other. In another example, when the PSFCH 1205 includes three or more OFDM symbols, the location of the DMSR RE in two or more OFDM symbols may be the same as each other.

Figure 13:
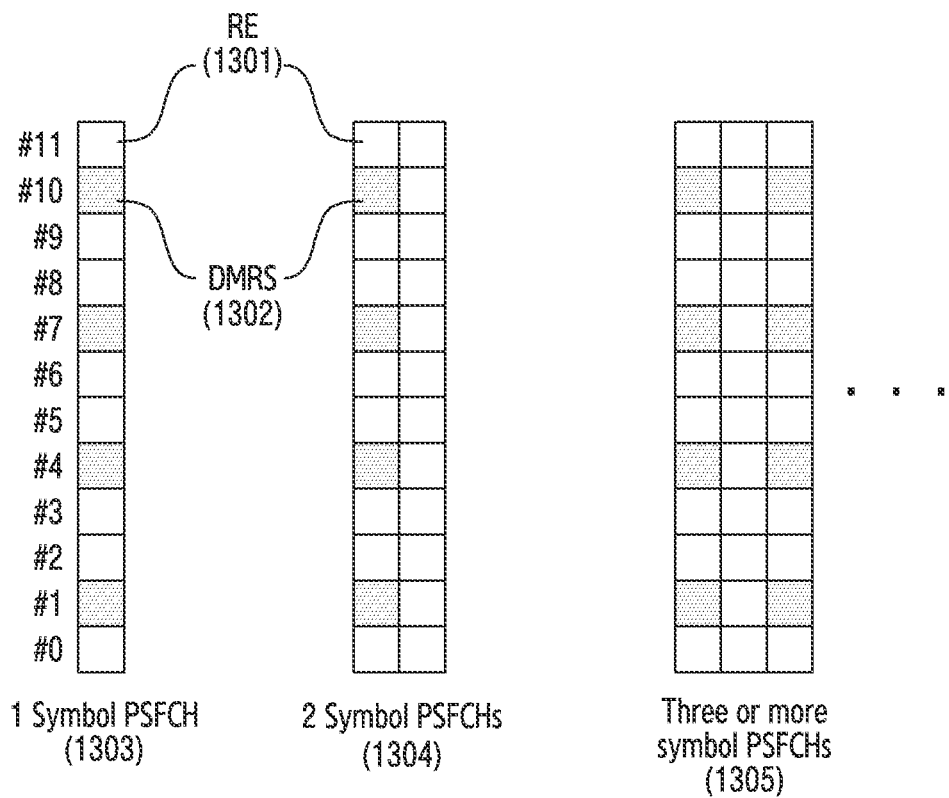
FIG. 13 illustrates a structure of a sidelink feedback channel in a wireless communication system according to an embodiment of the disclosure.

FIG. 13 illustrates a structure of a sidelink feedback channel in a wireless communication system according to an embodiment of the disclosure. Specifically, FIG. 13 illustrates another example of the structure of the sidelink feedback channel according to an embodiment.

Referring to FIG. 13, the sidelink feedback channel (PSFCH) may be used to transmit SFCI information generated by the procedure of FIG. 7. Although FIG. 13 illustrates that DMRS overhead is ⅓, that is, 4 REs are used as DMRSs 1302 in 12 Resource Elements (REs) 1301, the disclosure is not limited thereto. For example, when DMRS overhead is ¼, that is, when 3 REs are used as DMRSs 1302 in 12 Resource Elements (REs) 1301, the DMRSs may be mapped to RE index nos. 1, 5, and 9 (or 2, 6, and 10), and SFCI may be mapped to the remaining RE indexes.

Although FIG. 13 illustrates the structure of the PSFCH 1303 in one RB including 12 REs, the structure may be equally applied to the PSFCH 1304 including two or more RBs. For example, when it is assumed that two RBs correspond to the size of PSFCH frequency resources transmitted by one V2X reception UE, the DMRSs may be mapped to RE indexes 1, 4, 7, 10, 13, 16, 19, and 22, and SFCI may be mapped to the remaining RE indexes. Although not illustrated in FIG. 13, expansion of the structure of the PSFCH including four or more OFDM symbols is possible based on such principle.

When the PSFCH transmitted by one V2X reception UE includes two or more OFDM symbols in the time axis, the PSFCH including 1 OFDM symbol is repeated in FIG. 12. However, in FIG. 13, the DMRS may exist only in an odd-numbered OFDM symbol but may not exist in an even-numbered OFDM symbol. For example, in FIG. 13, the DMRS may exist only in first and third OFDM symbols but may not exist in a second OFDM symbol. Accordingly, in FIG. 13, the PSFCH may alternately include an OFDM symbol in which the DMRS exists and an OFDM symbol in which no DMRS exists.

The PSFCH illustrated in FIG. 13 may be mapped to K3 symbols within the sidelink resources of FIG. 11. Meanwhile, when SFCI information generated through the method of FIGS. 8 to 9 is transmitted through the PSFCH, the SFCI information may be mapped to all REs of the PSFCH without the DMRS 1302 in FIG. 13. However, in this case, there is no DMRS, and thus channel estimation performance of the V2X transmission UE receiving the PSFCH may deteriorate. Accordingly, as illustrated in FIG. 13, the SFCI information generated through the method of FIGS. 8 to 9 may be mapped to only the remaining REs other than the REs used for transmission of the DMRS 1302 as illustrated in FIG. 13.

Although FIG. 13 illustrates that the DMRSs exist in the same REs in the frequency axis even though the number of OFDM symbols increase, the disclosure is not limited thereto. For example, when the PSFCH 1305 includes three OFDM symbols, the location of the DMRS RE in the third OFDM symbol may be different from the location of the DMRS RE existing in the first OFDM symbol. Similarly, when the PSFCH includes four or more OFDM symbols, the location of the DMRS RE in each OFDM symbol in which the DMRS exists may be different from each other. In another example, when the PSFCH includes four or more OFDM symbols, the location of the DMSR RE in the OFDM symbols in which two or more DMRS exist may be the same as each other.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first user equipment (UE) for vehicle-to-everything (V2X) in a wireless communication system, the method comprising:
   receiving, from a base station (BS), configuration information for a sidelink, the configuration information comprising a resource pool;
   transmitting, to a second UE, sidelink control information (SCI) for scheduling a physical sidelink shared channel (PSSCH) based on the configuration information;
   transmitting, to the second UE, a sidelink data on the PSSCH based on the SCI; and
   receiving, from the second UE, hybrid automatic repeat request-acknowledgement (HARQ-ACK) information for the sidelink data on a physical sidelink feedback channel (PSFCH),
   wherein the configuration information includes at least one of a period of a resource of the PSFCH or a time gap between the PSFCH and the PSSCH.

2. The method of claim 1,
   wherein the configuration information is received via a radio resource control (RRC) signaling or a system information block (SIB), and
   wherein the configuration information further includes a set of frequency resources for the PSFCH.

3. The method of claim 1,
   wherein the period of the PSFCH is in a unit of slots, and
   wherein the time gap between the PSFCH and the PSSCH is in a unit of slots.

4. The method of claim 1, wherein the SCI includes at least one of information on a frequency resource assignment, information on a time resource assignment, information on a demodulation reference signal, information on a modulation and coding scheme (MCS), information on a HARQ process, information on a redundancy version, information on a source identity (ID), or information on a destination ID.

5. The method of claim 1,
   wherein the HARQ-ACK information includes ACK or negative-ACK (NACK), or only NACK, and
   wherein a value of a first sequence cyclic shift corresponding to the NACK is different from a value of a second sequence cyclic shift corresponding to the ACK.

6. A method performed by a second user equipment (UE) for vehicle-to-everything (V2X) in a wireless communication system, the method comprising:
   receiving, from a base station (BS), configuration information for a sidelink, the configuration information comprising a resource pool;
   receiving, from a first UE, sidelink control information (SCI) for scheduling a physical sidelink shared channel (PSSCH) based on the configuration information;
   receiving, from the first UE, a sidelink data on the PSSCH based on the SCI; and
   transmitting, to the first UE, hybrid automatic repeat request-acknowledgement (HARQ-ACK) information for the sidelink data on a physical sidelink feedback channel (PSFCH),
   wherein the configuration information includes at least one of a period of a resource of the PSFCH or a time gap between the PSFCH and the PSSCH.

7. The method of claim 6,
   wherein the configuration information is received via a radio resource control (RRC) signaling or a system information block (SIB), and
   wherein the configuration information further includes a set of frequency resources for the PSFCH.

8. The method of claim 6,
   wherein the period of the PSFCH is in a unit of slots, and
   wherein the time gap between the PSFCH and the PSSCH is in a unit of slots.

9. The method of claim 6, wherein the SCI includes at least one of information on a frequency resource assignment, information on a time resource assignment, information on a demodulation reference signal, information on a modulation and coding scheme (MCS), information on a HARQ process, information on a redundancy version, information on a source identity (ID), or information on a destination ID.

10. The method of claim 6,
    wherein the HARQ-ACK information includes ACK or negative-ACK (NACK), or only NACK, and
    wherein a value of a first sequence cyclic shift corresponding to the NACK is different from a value of a second sequence cyclic shift corresponding to the ACK.

11. A first user equipment (UE) for vehicle-to-everything (V2X) in a wireless communication system, the first UE comprising:
    a transceiver configured to transmit or receive a signal; and
    at least one processor coupled with the transceiver and configured to:
        receive, from a base station (BS), configuration information for a sidelink, the configuration information comprising a resource pool,
        transmit, to a second UE, sidelink control information (SCI) for scheduling a physical sidelink shared channel (PSSCH) based on the configuration information,
        transmit, to the second UE, a sidelink data on the PSSCH based on the SCI, and
        receive, from the second UE, hybrid automatic repeat request-acknowledgement (HARQ-ACK) information for the sidelink data on a physical sidelink feedback channel (PSFCH),
    wherein the configuration information includes at least one of a period of a resource of the PSFCH or a time gap between the PSFCH and the PSSCH.

12. The first UE of claim 11,
    wherein the configuration information is received via a radio resource control (RRC) signaling or a system information block (SIB), and
    wherein the configuration information further includes a set of frequency resources for the PSFCH.

13. The first UE of claim 11,
    wherein the period of the PSFCH is in a unit of slots, and
    wherein the time gap between the PSFCH and the PSSCH is in a unit of slots.

14. The first UE of claim 11, wherein the SCI includes at least one of information on a frequency resource assignment, information on a time resource assignment, information on a demodulation reference signal, information on a modulation and coding scheme (MCS), information on a HARQ process, information on a redundancy version, information on a source identity (ID), or information on a destination ID.

15. The first UE of claim 11,
wherein the HARQ-ACK information includes ACK or negative-ACK (NACK), or only NACK, and
wherein a value of a first sequence cyclic shift corresponding to the NACK is different from a value of a second sequence cyclic shift corresponding to the ACK.

16. A second user equipment (UE) for vehicle-to-everything (V2X) in a wireless communication system, the second UE comprising:
a transceiver configured to transmit or receive a signal; and
at least one processor coupled with the transceiver and configured to:
receive, from a base station (BS), configuration information for a sidelink, the configuration information comprising a resource pool,
receive, from a first UE, sidelink control information (SCI) for scheduling a physical sidelink shared channel (PSSCH) based on the configuration information,
receive, from the first UE, a sidelink data on the PSSCH based on the SCI, and
transmit, to the first UE, hybrid automatic repeat request-acknowledgement (HARQ-ACK) information for the sidelink data on a physical sidelink feedback channel (PSFCH),
wherein the configuration information includes at least one of a period of a resource of the PSFCH or a time gap between the PSFCH and the PSSCH.

17. The second UE of claim 16,
wherein the configuration information is received via a radio resource control (RRC) signaling or a system information block (SIB), and
wherein the configuration information further includes a set of frequency resources for the PSFCH.

18. The second UE of claim 16,
wherein the period of the PSFCH is in a unit of slots, and
wherein the time gap between the PSFCH and the PSSCH is in a unit of slots.

19. The second UE of claim 16, wherein the SCI includes at least one of information on a frequency resource assignment, information on a time resource assignment, information on a demodulation reference signal, information on a modulation and coding scheme (MCS), information on a HARQ process, information on a redundancy version, information on a source identity (ID), or information on a destination ID.

20. The second UE of claim 16,
wherein the HARQ-ACK information includes ACK or negative-ACK (NACK), or only NACK, and
wherein a value of a first sequence cyclic shift corresponding to the NACK is different from a value of a second sequence cyclic shift corresponding to the ACK.

* * * * *